US009712951B2

United States Patent
Kirshenberg et al.

(10) Patent No.: US 9,712,951 B2
(45) Date of Patent: Jul. 18, 2017

(54) EXTENDED BLUETOOTH COMMUNICATION MODES

(71) Applicant: Apple Inc., Cupertino, CA (US)

(72) Inventors: Gilad Kirshenberg, Raanana (IL); Alon Paycher, Beit-Hananya (IL); Ran Katz, Givatayim (IL); Yonathan Shavit, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/706,301

(22) Filed: May 7, 2015

(65) Prior Publication Data

US 2015/0327001 A1 Nov. 12, 2015

Related U.S. Application Data

(60) Provisional application No. 61/991,292, filed on May 9, 2014.

(51) Int. Cl.
*H04B 7/00* (2006.01)
*H04W 4/00* (2009.01)
*H04W 28/18* (2009.01)
*H04W 76/02* (2009.01)
*H04W 84/20* (2009.01)
*H04W 76/04* (2009.01)

(52) U.S. Cl.
CPC .......... *H04W 4/008* (2013.01); *H04W 28/18* (2013.01); *H04W 76/021* (2013.01); *H04W 76/04* (2013.01); *H04W 84/20* (2013.01)

(58) Field of Classification Search
CPC ..................................................... H04W 28/18
See application file for complete search history.

(56) References Cited

U.S. PATENT DOCUMENTS

| | | | | |
|---|---|---|---|---|
| 2002/0168937 | A1* | 11/2002 | Clark | B23K 9/1062 455/41.1 |
| 2004/0242258 | A1* | 12/2004 | Kim | H04W 52/245 455/522 |
| 2006/0088123 | A1* | 4/2006 | Jensen | H04L 27/0008 375/295 |

(Continued)

OTHER PUBLICATIONS

Garvert, "BLE 101—Bluetooth low energy," CSR, 74 pages.

(Continued)

*Primary Examiner* — Hsin-Chun Liao
(74) *Attorney, Agent, or Firm* — Downey Brand LLP

(57) ABSTRACT

A method and system for an improved communication mode for Bluetooth wireless devices is disclosed. Packets used in the improved communication mode are encoded using a convolutional encoder and transmitted with a particular modulation index such that the improved communication mode provides an improved link margin with respect to a communication mode specified in a Bluetooth wireless communication protocol. In this regard, the improved communication mode allows Bluetooth wireless devices to continue to communicate when a communication link between the Bluetooth wireless devices degrades, whereas otherwise the connection would be dropped. Furthermore, the Bluetooth wireless devices seamlessly switch between the improved communication mode and other Bluetooth communication modes without renegotiating the connection.

20 Claims, 30 Drawing Sheets

(56) References Cited

U.S. PATENT DOCUMENTS

| | | | | |
|---|---|---|---|---|
| 2010/0021176 A1* | 1/2010 | Holcombe | ......... | H04B 10/1143 |
| | | | | 398/115 |
| 2011/0126077 A1* | 5/2011 | Park | ...................... | H04L 1/0057 |
| | | | | 714/755 |
| 2012/0163188 A1* | 6/2012 | Kobayashi | .......... | H04L 65/4092 |
| | | | | 370/241 |

OTHER PUBLICATIONS

"Bluetooth PANs IEEE 802.15," 62 pages.
Alcorn, "Windows Embedded Compact—Bluetooth Architecture Overview," Microsoft, Mar. 2011, 13 pages.
Kansai, "Bluetooth Primer," Red-M, 2002, 30 pages.
Kumar, "Bluetooth Tutorial: Radio, Baseband, L2CAP and LMP Specifications," IBM India Research Lab, 33 pages.
Chakraborty et al., "Analysis of the Bluetooth device discovery protocol," Springer, Wireless Netw, vol. 16, Issue 2, DOI 10.1007/s11276-008-0142-1, Oct. 2008, 16 pages.
Zanella, "Analysis of the Packet Reception Statistics of Bluetooth v2+EDR in Fading Channels," Jan. 2007, 8 pages.
Martelli, "Wireless Sensor Networks: Bluetooth Low Energy," Universita Di Bologna, 2014, 58 pages.
"Bluetooth Service Specification: Running Speed and Cadence Service," Bluetooth®, Bluetooth® DOC, V10, Aug. 2012, 19 pages.

\* cited by examiner

| Bluetooth (BT) Mode | Data Rate (Mbps) |
|---|---|
| Basic Rate (BR) GFSK | 1 |
| Enhanced Data Rate (EDR) $\pi/4$ + DQPSK | 2 |
| Enhanced Data Rate (EDR) 8 – DPSK | 3 |
| BUX BR | 0.5 |
| BUX EDR $\pi/4$ + DQPSK | 1 |
| BUX ESR 8 – DPSK | N/A |

BT Legacy Modes: Basic Rate (BR) GFSK, Enhanced Data Rate (EDR) $\pi/4$ + DQPSK, Enhanced Data Rate (EDR) 8 – DPSK BUX Modes: BUX BR, BUX EDR $\pi/4$ + DQPSK, BUX ESR 8 – DPSK

| Type | Payload Header (Bytes) | User Payload (Bytes) | FEC | CRC | Symmetric Max Rate (kbps) | Asymmetric Max Rate (kbps) |
|---|---|---|---|---|---|---|
| NULL-B | n/a | n/a | BUX | n/a | n/a | n/a |
| POLL-B | n/a | n/a | BUX | n/a | n/a | n/a |
| FHS-B | n/a | 18 | BUX | yes | n/a | n/a |

| Type | Payload Header (Bytes) | User Payload (Bytes) | FEC | CRC |
|---|---|---|---|---|
| DM1-B | 1 | 1 | BUX | yes |
| DH1-B | 1 | 8 | BUX | yes |
| DM3-B | 2 | 48 | BUX | yes |
| DH3-B | 2 | 85 | BUX | yes |
| DM5-B | 2 | 100 | BUX | yes |
| DH5-B | 2 | 163 | BUX | yes |
| AUX1-B | 1 | 10 | BUX | |
| 2-DH1-B | 2 | 22 | BUX | yes |
| 2-DH3-B | 2 | 178 | BUX | yes |
| 2-DH5-B | 2 | 334 | BUX | yes |
| EV3-B | n/a | 12 | BUX | yes |
| EV4-B | n/a | 53 | BUX | yes |
| EV5-B | n/a | 90 | BUX | yes |
| 2-EV3-B | n/a | 28 | BUX | yes |
| 2-EV5-B | n/a | 184 | BUX | yes |

| Segment | Type Code | Slot Occupancy | BUX SCO (BR) | BUX eSCO (BR) | BUX eSCO (ESR) | BUX SCL (BR) | BUX ACL (EDR) |
|---|---|---|---|---|---|---|---|
| 1 | 0000 | 1 | NULL-B | NULL-B | NULL-B | NULL-B | NULL-B |
| | 0001 | 1 | POLL-B | POLL-B | POLL-B | POLL-B | POLL-B |
| | 0010 | 1 | FHS-B | reserved | reserved | FHS-B | FHS-B |
| | 0011 | 1 | DM1-B | reserved | reserved | DM1-B | DM1-B |
| 2 | 0100 | 1 | | | | DH1-B | 2-DH1-B |
| | 0101 | 1 | HV1-B | | | | |
| | 0110 | 1 | HV2-B | | 2-EV3-B | | |
| | 0111 | 1 | HV3-B | EV3-B | 3-EV3-B | | |
| | 1000 | 1 | DV-B | | | | 3-DH1-B |
| | 1001 | 1 | | | | AUX1-B | AUX1-B |
| 3 | 1010 | 3 | | | | DM3-B | 2-DH3-B |
| | 1011 | 3 | | | | DH3-B | 3-DH3-B |
| | 1100 | 3 | | EV4-B | 2-EV5-B | | |
| | 1101 | 3 | | EV5-B | 3-EV5-B | | |
| 4 | 1110 | 5 | | | | DM5-B | 2-DH5-B |
| | 1111 | 5 | | | | DH5-B | 3-DH5-B |

| Preamble (1 octet) 2102 | Access Address (8 octets) 2104 | Coded PDU (6 to 80 octets) 2106 | Coded CRC (6 octets) 2108 |

| | Payload | |
| --- | --- | --- |
| InitA (6 octets) 2112 | AdvA (6 octets) 2114 | LLData (26 octets) 2116 |

| | Payload | | | | | | | |
| --- | --- | --- | --- | --- | --- | --- | --- | --- |
| AA-B (8 octets) 2120 | CRCInit (3 octets) | WinSize (1 octet) | WinOffset (2 octets) | Interval (2 octets) | Latency (2 octets) | Timeout (2 octets) | ChM (5 octets) | Hop (5 bits) | SCA (3 bits) |

FIG. 21C

EXTENDED BLUETOOTH COMMUNICATION MODES

CROSS-REFERENCE TO RELATED APPLICATIONS

This application claims the benefit of U.S. Provisional Application No. 61/991,292, entitled "BLUETOOTH USER EXPERIENCE," by Kirshenberg et al., filed on May 9, 2014, the content of which is hereby incorporated by reference in its entirety for all purposes.

FIELD

The present disclosure relates generally to wireless communication technology, including modes of communication using Bluetooth® (BT) wireless communication protocols.

BACKGROUND

Recent advances in wireless devices and mobile applications have resulted in increased and ubiquitous use of wireless devices. One consequence of this increased use is the potential for wireless radio frequency interference to occur when multiple wireless devices operate within the same radio frequency signaling range. For example, when deploying a wireless device, such as an access point, a wireless network planner may take into consideration distances between the wireless device and other collocated wireless devices, as well as the maximum and/or average transmit signaling power of the wireless device.

Sometimes, wireless radio frequency interference is unavoidable. For example, devices such as microwave ovens and television sets can generate radio frequency interference when operating. In addition, buildings and other non-movable structures can introduce reflections of wireless signals (e.g., multi-path interference) that can cause signaling interference in locations where wireless operations must be performed. Therefore, what is desired is an improved implementation of wireless communication when a wireless communication link is poor or degraded due to radio frequency interference but wireless communication is still desired.

SUMMARY

Techniques to improve wireless personal area network (WPAN) communication modes between wireless devices, including methods and apparatus for extended Bluetooth communication modes for wireless devices, are disclosed. The improved WPAN communication modes provide an improved link margin, allowing the wireless devices to communicate when a link signal quality between the wireless devices degrades. The link signal quality can degrade due to wireless radio frequency interference from other wireless devices.

When implemented in conjunction with an established wireless communication protocol, such as a Bluetooth wireless communication protocol, the improved WPAN communication modes provide additional modes of communication for the wireless device. In this regard, the improved WPAN communication modes extend the modes of communication available to wireless devices with respect to established wireless communication protocols, and in some embodiments, allows a wireless device to continue communication over an established connection when otherwise communication would be severely compromised or would drop due to poor link signal quality. In some embodiments, the wireless device seamlessly switches between the improved WPAN communication mode and other WPAN communication modes, such as Bluetooth communication modes, without renegotiating an existing connection, such as a connection in accordance with an established Bluetooth communication protocol.

In some embodiments, the improved link margin is due in part to (i) an encoding scheme, (ii) a modulation index, and (iii) a data rate used when communicating in the improved WPAN communication mode. Packets for transmission using the improved WPAN communication mode are encoded using a convolutional encoder, as opposed to another forward error correction (FEC) encoder specified in a Bluetooth wireless communication protocol. Furthermore, the encoded packets are transmitted using an optimal modulation index that is selected to optimize the link margin. In some embodiments, the data rate used when communicating in the improved WPAN communication mode is reduced with respect to a data rate used in a Bluetooth communication mode specified in a Bluetooth wireless communication protocol.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements

FIG. 4 illustrates a table showing different example modes of communication in accordance with some embodiments.

FIGS. 7A to 7C illustrate a table of exemplary packets used in a mode of communication in accordance with some embodiments.

FIGS. 21A to 21C illustrate various exemplary packet formats in accordance with some embodiments.

DETAILED DESCRIPTION

Figure 1:
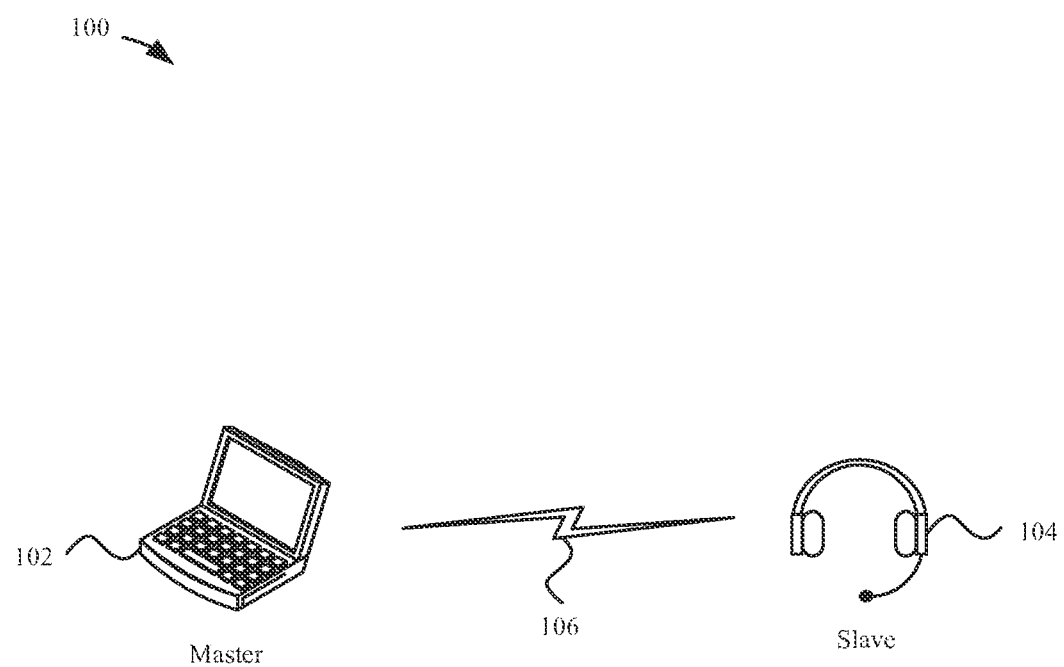
FIG. 1 illustrates an example wireless system in accordance with some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Method and apparatus for an improved communication mode, also referred to herein as a "better user experience" (BUX) mode, for wireless devices using Bluetooth (BT) wireless communication protocols are disclosed.

In some embodiments, the BUX mode provides an improved link margin for wireless devices. The improved link margin allows two wireless devices to establish and/or maintain a communications link when a signal quality for the communications link between the wireless devices is relatively "poor" or degrades. In some cases, the BUX mode can include maintaining a communications link at a reduced data rate. A Bluetooth wireless communication protocol can define a communication mode that can require a communications link between wireless devices to have a minimum communication link signal quality level in order to carry out communications. When the communication link signal quality deteriorates below a minimum communication link signal quality level, the communication link may be unable to support communication in accordance with the Bluetooth wireless communication protocol. Bluetooth wireless devices that are "BUX enabled" and configured to use the improved communication mode can continue to communicate using the BUX mode when the communication link signal quality degrades such that the communication link can no longer support a "legacy" Bluetooth mode. In this regard, the embodiments herein provide an additional communication mode, e.g., for extended range communication or for operation with higher noise/interferences levels, than is provided by current Bluetooth wireless communication protocols.

In some embodiments, the BUX mode provides the improved link margin by using (i) a particular packet encoding, and (ii) an optimal modulation index that is selected to carry out BUX mode communications. The particular packet encoding can include using a convolutional encoder for forward error correction instead of other forward error correction encoders specified for current Bluetooth wireless communication protocols. In some embodiments, Bluetooth wireless devices that are "BUX enabled" can listen for both BUX mode packets and legacy BT packets concurrently, thereby allowing a transmitting Bluetooth wireless device to activate a BUX mode for communication with another Bluetooth wireless device that supports BUX mode by sending a BUX mode packet to the other Bluetooth wireless device. In some embodiments, transitioning by a Bluetooth wireless device between operating in a BUX mode and a legacy BT mode can be seamless such that the Bluetooth wireless device need not renegotiate its connection with another Bluetooth wireless device when transitioning between modes.

It can be appreciated that embodiments described herein using Bluetooth wireless communication techniques and Bluetooth wireless devices are provided by way of example, and not by way of limitation. In this regard, embodiments described herein can be applied to other wireless networks using other technologies/protocols in which a wireless device can wirelessly communicate.

These and other embodiments are discussed below with reference to FIGS. 1 to 25; however, those skilled in the art will readily appreciate that the detailed description given herein with respect to these figures is for explanatory purposes only and should not be construed as limiting.

FIG. 1 illustrates an example wireless system 100 in accordance with some embodiments. The wireless system 100 can include a first wireless device 102 that can communicate with a second wireless device 104 over a wireless communication link 106. By way of non-limiting example, the first wireless device 102 and the second wireless device 104 can each be embodied as a cellular phone, such as a smart phone device, a tablet computing device, a laptop computing device, a user interface device, a media player, a camera, a remote control, a headset, a printer, a wireless audio system, a wearable computing device, and/or any other computing device that can be configured to communicate over one or more wireless networks.

In some embodiments, the first wireless device 102 and the second wireless device 104 can be configured to communicate over the wireless communication link 106 in accordance with a Bluetooth wireless communication protocol. In this regard, the first wireless device 102 and the second wireless device 104 can form a peer-to-peer Bluetooth wireless network, which can be referred to as a piconet. In some embodiments, the first wireless device 102 can operate as a "master" wireless device of the piconet, while the second wireless device 104 can operate as a "slave" wireless device of the piconet. In some embodiments, the second wireless device 104 can operate as the master of the piconet, while the first wireless device 102 can operate as a slave of the piconet. Although the wireless system 100 only illustrates the first wireless device 102 and the second wireless device 104, it can be appreciated that the wireless system 100 can include more than two wireless devices. For example, a Bluetooth wireless communication protocol can specify that a single piconet can include up to eight wireless devices (one master and seven slaves). Furthermore, the wireless system 100 can include a plurality of piconets, which can be referred to as a scatternet, such that a single wireless device can operate as a master or a slave in more than one piconet. In some embodiments, the master wireless device can also be referred to as a "central" wireless device, while the slave wireless devices can be referred to as "peripheral" wireless devices.

Figure 2:
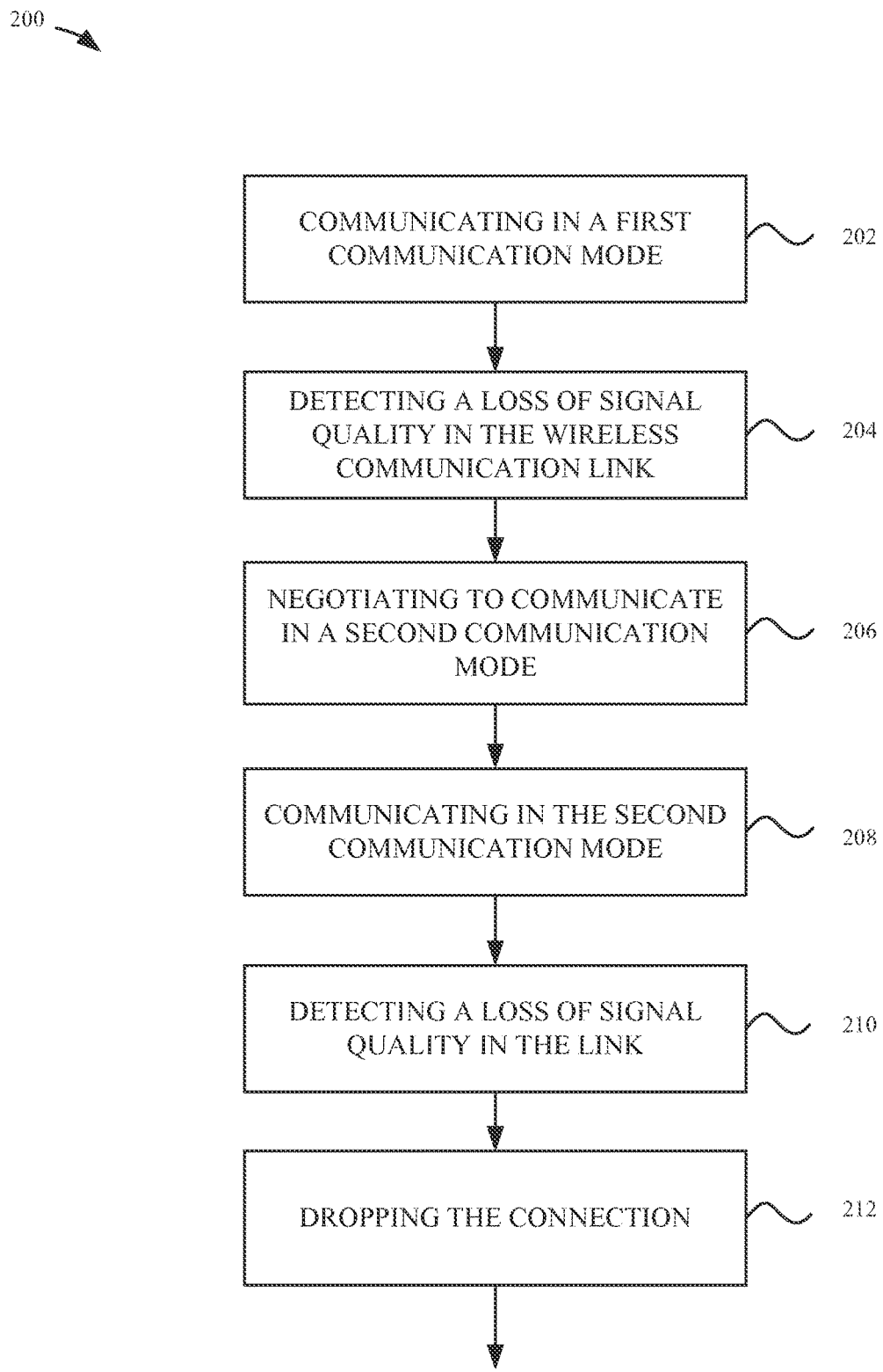
FIG. 2 illustrates a flow chart of an exemplary method for communicating in different modes in accordance with some embodiments.

FIG. 2 illustrates a flow chart 200 of an exemplary method for communicating between wireless devices in accordance with some embodiments. In this regard, FIG. 2 illustrates steps that can be performed by the first wireless device 102 and the second wireless device 104 in accordance with various embodiments. Step 202 can include the first wireless device 102 and the second wireless device 104 communicating over the wireless communication link 106 in a first communication mode. When communicating in the first communication mode, the first wireless device 102 and the second wireless device 104 can be limited to communicating at a first data rate. For example, the Bluetooth v2.0+ Enhanced Data Rate (EDR) wireless communication protocol specifies a mode of communication having a data rate of 2 megabits per second (Mbps) and using a π/4+differential quaternary phase-shift keying (DQPSK) modulation scheme. This mode can be referred to herein as an EDR π/4+DQPSK mode.

Step 204 can include detecting a loss of signal quality in the wireless communication link 106 (or more generally detecting a change in one or more performance metrics monitored for the wireless communication link 106). Either the first wireless device 102 or the second wireless device 104 can detect the loss of signal quality in the wireless communication link 106. The loss of signal quality in the wireless communication link 106 can include, but not be limited to, a reduction in signal strength, a packet-related error, such as a cyclic redundancy check (CRC) failure, an increase in bit error rate (BER), an increase in packet error rate (PER), the receipt of a negative-acknowledge (NACK) message, the absence of the receipt of an acknowledgement (ACK) message, and/or an increase in a measured signal-to-noise ratio (SNR) or signal-to-noise-plus-interference ratio (SINR). In some embodiments, the loss of signal quality in the wireless communication link 106 can be based on a characteristic of the wireless communication link 106, e.g., a performance metric, satisfying a threshold, e.g., dropping below a level such as for an SNR, or exceeding a level such as for a BER. For example, the loss of signal quality in the wireless communication link 106 can occur when a measured received signal strength indication (RSSI) value drops below a particular threshold. In another example, the loss of signal quality in the wireless communication link 106 can occur when a wireless device detects a particular number of packet errors within a certain period of time or detects a particular number of consecutive packet errors.

Step 206 can include the wireless devices 102/104 negotiating to communicate in a second communication mode in response to detecting the loss of signal quality in the wireless communication link 106 at step 204. When communicating in the second communication mode, the first wireless device 102 and the second wireless device 104 can be limited to communicating at a second data rate. The second data rate can be less than the first data rate. In this regard, the first wireless device 102 and the second wireless device 104 communicate at a different data rate due to changes in the quality of the wireless communication link 106. For example, the Bluetooth v2.0+EDR protocol specifies another mode of communication having a data rate of 1 Mbps referred to as a Basic Rate (BR) mode. The Basic Rate mode can use a Gaussian frequency-shift keying (GFSK) modulation scheme. After negotiation between the wireless devices concludes, the wireless devices continue to communicate in the second communication mode at step 208. Step 210 can include detecting a subsequent loss of signal quality in the wireless communication link 106. In response, the first wireless device 102 and/or the second wireless device 104 can determine that the wireless communication link 106 can no longer support communications between the wireless devices and drop the connection at step 212.

Figure 3:
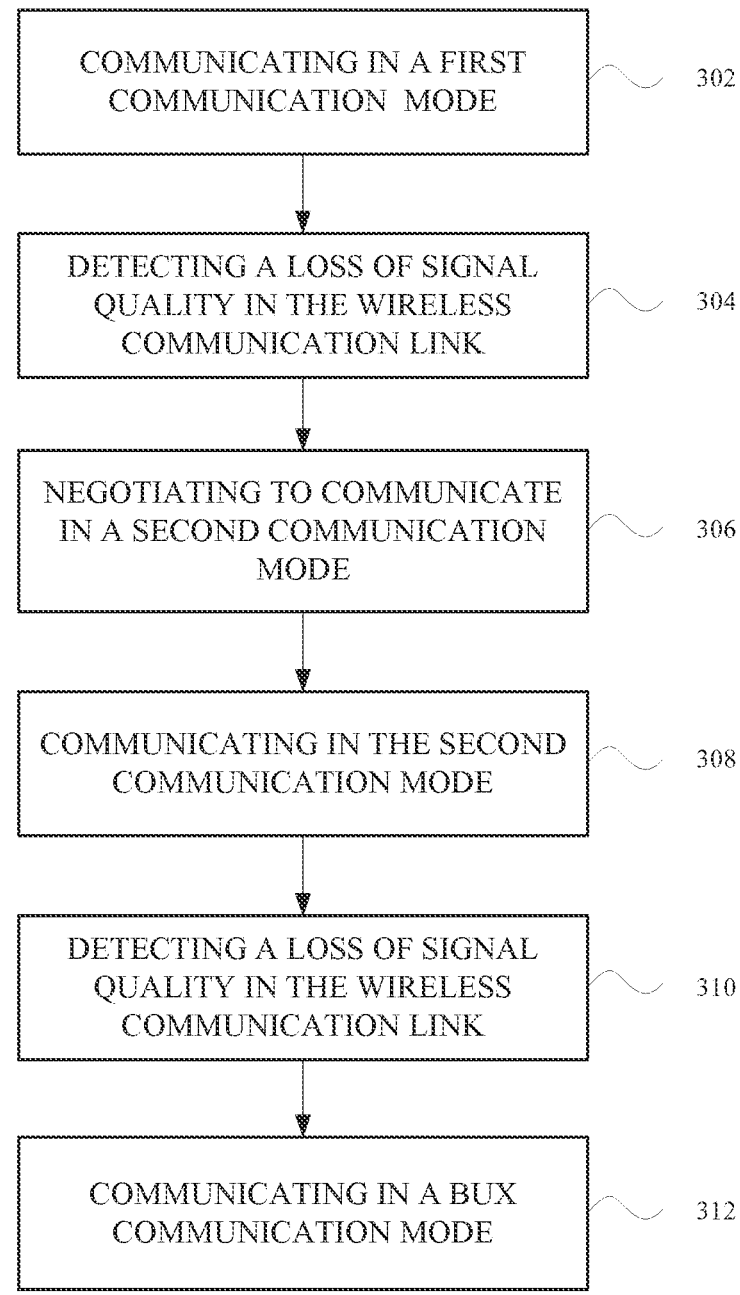
FIG. 3 illustrates another flow chart of an exemplary method for communicating in different modes in accordance with some embodiments.

FIG. 3 illustrates another flow chart 300 of an exemplary method of communicating between wireless devices in accordance with some embodiments. In one embodiment, steps 302-310 are similar to steps 202-210 respectively. In this regard, steps 302-310 can be performed by the first wireless device 102 and the second wireless device 104 as described in steps 202-210 in FIG. 2. After detecting a subsequent loss of signal quality in the wireless communication link 106 at step 310, the wireless devices can communicate in a BUX communication mode at step 312. When communicating in the BUX communication mode, the first wireless device 102 and the second wireless device 104 can be limited to communicating at a third data rate that is less than the first and second data rates. In contrast with the method of FIG. 2, in which the wireless connection between the wireless devices was dropped (step 212) in response to detecting the subsequent loss of signal quality in the wireless communication link 106 (step 210), the wireless devices in step 312 of FIG. 3 instead continue to communicate using the BUX communication mode. As described in further detail herein, communicating in a BUX communication mode can provide an additional mode/level of communication for wireless devices communicating via a Bluetooth wireless communication protocol. The BUX communication mode can extend the range and/or operating conditions under which communication between wireless devices that support the BUX communication mode can operate. In some embodiments, communicating in the BUX communication mode improves a link margin for each "BUX enabled" wireless device. In this regard, the embodiments described herein enable the wireless devices to continue to communicate, at a lower data rate than possible with current Bluetooth wireless communication protocols, despite a poorer link signal quality.

In some embodiments, the wireless devices can seamlessly transition from communicating in the second communication mode, e.g., in a "Basic Rate" BT communication mode, to communicating in the BUX communication mode. In this regard, the wireless devices do not need to negotiate the transition from operating in the second communication mode to operating in the BUX communication mode upon detecting the loss of signal quality in the wireless communication link 106 at step 310. Either the first wireless device 102 or the second wireless device 104 can initiate communications in the BUX communication mode, e.g., by sending a BUX coded message to the other peer wireless device. In some embodiments, BUX enabled wireless devices can exchange a preferred modulation index. The exchange of the preferred modulation index can occur before the wireless devices communicate with each other in the BUX communication mode. The exchange of the preferred modulation index can allow each wireless device to pick an optimal modulation index for its own receiver. In a representative embodiment, a resolution of the modulation index can be 0.05.

FIG. 4 shows a table 400 listing different example Bluetooth modes of communication in accordance with some embodiments. Column 402 identifies several types of Bluetooth communication modes. The BT communication modes listed in column 402 can include BT communication modes that are specified by a Bluetooth wireless communication protocol (e.g., BT legacy communication modes), such as a basic rate (BR) GFSK mode, an Enhanced Data Rate (EDR) π/4+DQPSK modulation mode, and an EDR 8-DPSK modulation mode, which are specified for the Bluetooth v2.X+EDR wireless communication protocols (and for subsequent Bluetooth 3.X and 4.X wireless communication protocols). The BT communication modes listed in column 402 can also include BUX communication modes. In some embodiments, BUX communication modes are not specified in a Bluetooth wireless communication protocol, e.g., the BUX communication modes are instead provided as a "proprietary" or "non-standard" communication mode. In some embodiments, a BUX communication mode is incorporated as a mandatory communication mode or as an optional communication mode in a Bluetooth wireless communication protocol, e.g., which can be under development or standardized beyond the present BT wireless communication protocols. A BUX communication mode can be based on or correspond to a BT legacy communication mode, e.g., providing an extension of a BT legacy mode to new operating ranges. The three BUX communication modes listed in table 400 can be based on the three BT legacy communication modes respectively. For example, the EDR π/4+DQPSK legacy communication mode can correspond to the BUX EDR π/4+DQPSK communication mode. In some embodiments, a BUX communication mode and its corresponding BT legacy communication mode use the same modulation scheme.

Column 404 includes a data rate at which wireless devices can communicate for each BT communication mode identified in column 402. The data rates listed in column 404 can represent a maximum achievable data rate for communication using the BT communication mode. As would be understood by a person of ordinary skill, BT wireless devices communicate using burst transmission at a particular symbol rate with a particular symbol modulation scheme that provides for an "instantaneous" data rate, which can correspond to the data rate listed in column 404. In some embodiments, the data rates listed in column 404 are specified by a Bluetooth wireless communication protocol. For example, the Bluetooth v2.0+EDR wireless communication protocol specifies that in the EDR 8-DPSK communication mode, the wireless devices can communicate at a data rate of 3 Mbps. In other embodiments, such as in the case for the BUX communication modes, the data rates can be not specified by a current Bluetooth wireless communication protocol. In some embodiments, the data rate for a BUX communication mode is less than the data rate of a corresponding BT legacy communication mode. For example, the BR GFSK communication mode provides a data rate of 1 Mbps, while the BUX BR communication mode provides a data rate of 0.5 Mbps. In some embodiments, a BUX communication mode equivalent of a BT legacy communication mode may not be supported. For example, the data rate for the BUX EDR 8-DPSK legacy communication mode is listed as "not applicable" (NA) because a BUX EDR 8-DPSK communication mode is not supported.

Figure 5:
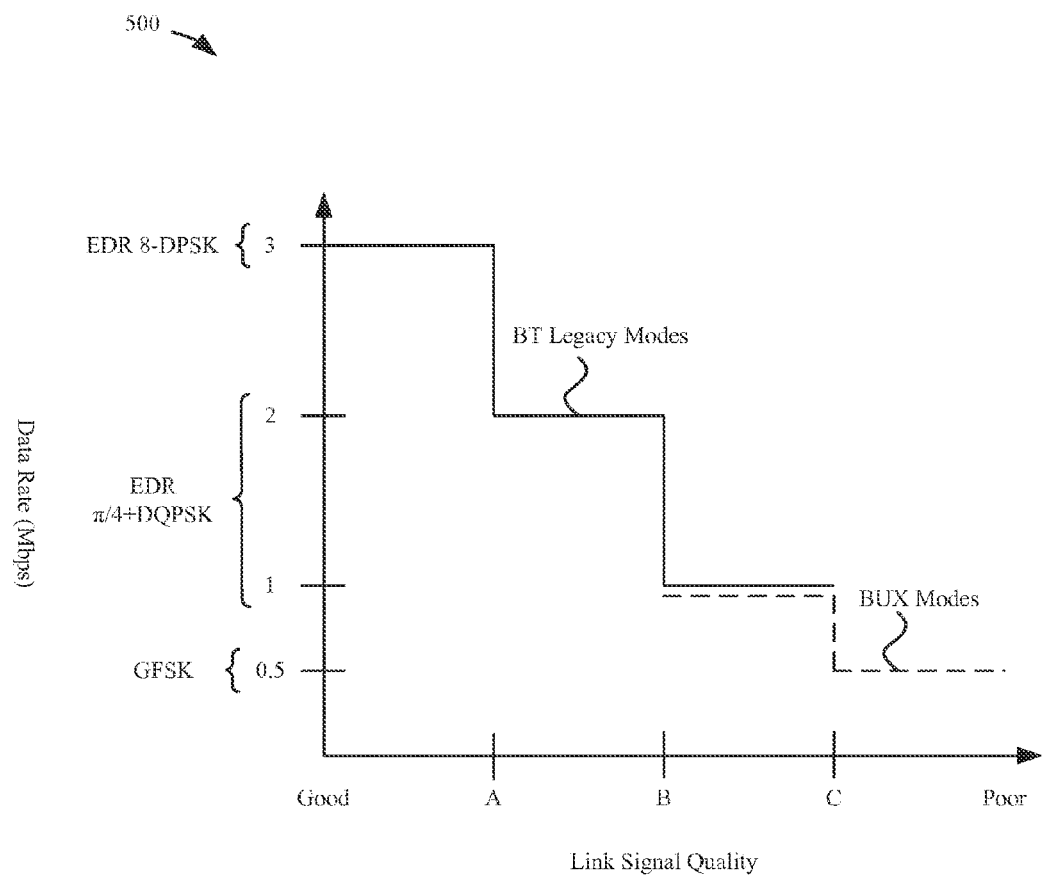
FIG. 5 illustrates a graph showing an exemplary relationship between link signal quality and data rate in accordance with some embodiments.

FIG. 5 shows a graph 500 illustrating an exemplary relationship between a link signal quality and a data rate in accordance with some embodiments. The data rates can be associated with one or more BT (legacy and/or BUX) modes in table 400. The horizontal x-axis can represent a link signal quality of the wireless communication link 106, while the vertical y-axis can represent the data rate at which the first wireless device 102 and the second wireless device 104 can communicate. Referring to the x-axis, the link signal quality decreases from a "good" link signal quality level to a "poor" link signal quality level, between which different signal quality threshold values can set. For a link signal quality level equal to or exceeding a link signal quality threshold value of "A", the wireless devices can communicate at a data rate of 3 Mbps (e.g., using an EDR 8-PSK BT legacy communication mode).

For a link signal quality of the wireless communication link 106 having values between link signal quality threshold values "A" and "B", the wireless devices can communicate at a data rate of 2 Mbps (e.g., using an EDR π/4+DQPSK BT legacy communication mode). For a link signal quality of the wireless communication link 106 between link signal quality threshold values "B" and "C," the wireless devices can communicate with a data rate of 1 Mbps using either a BT legacy communication mode or a BUX communication mode. In some embodiments, the wireless devices can communicate at a data rate of 1 Mbps in a legacy BT BR GFSK communication mode. In some embodiments, the wireless devices can communicate at a data rate of 1 Mbps in a BUX BR communication mode. In some embodiments, the BUX BR communication mode and the legacy BR GFSK BT communication mode can both use a GFSK modulation scheme.

When the link signal quality of the wireless communication link 106 has a value at or less than a threshold value "C," the wireless devices can communicate at a data rate of 0.5 Mbps. At values of link signal quality equal to or below the threshold value "C," communication between the wireless devices is not supported by a BT legacy communication mode but is supported using a BUX communication mode. For example, the Bluetooth v2.0+EDR wireless communication protocol does not provide a communication mode that provides for a data rate of 0.5 Mbps. Wireless devices that are not BUX enabled can instead drop a connection upon detecting a link signal quality for the wireless communication link 106 equal to or below the threshold value "C" (similar to step 212 in FIG. 2). In this regard, the BUX BR communication mode provides an additional communication mode beyond those specified in the present Bluetooth wireless communication protocols.

Although the embodiments describe herein include a BR BUX communication mode that supports communication at a data rate of 0.5 Mbps, this particular data rate is provided for illustrative purposes only. It can be appreciated that the data rate(s) supported by a BUX communication mode (or set of BUX communication modes) can be selected to be any set of data rate values. In some embodiments, the BUX communication mode provides an additional data rate that supplements other data rates provided by a "standard" Bluetooth wireless communication protocol. In some embodiments, the data rate value supported by a BUX communication mode is based on an improved link margin that the BUX communication mode provides.

Figure 6A:
FIGS. 6A and 6B illustrate an exemplary packet format in accordance with some embodiments.
Figure 6B:
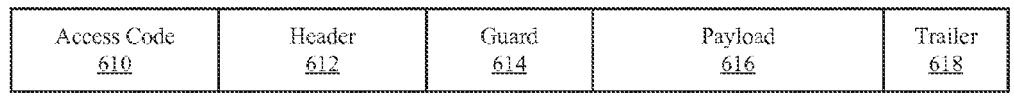

FIG. 6A illustrates an exemplary Bluetooth BR packet format 600 in accordance with some embodiments. The Bluetooth BR packet format 600 can be used to format packets that are communicated using a BR GFSK communication mode. The Bluetooth BR packet format 600 can include an access code 602, a header 604 and a payload 606. FIG. 6B illustrates an exemplary Bluetooth EDR packet format 608 in accordance with some embodiments. The Bluetooth EDR packet format 608 can be used to format packets that are communicated using an EDR 8-DPSK communication mode and/or using an EDR π/4+DQPSK communication mode. The Bluetooth EDR packet format 608 can include an access code 610, a header 612, a guard 614, a payload 616 and a trailer 618.

Packets that are (i) encoded and (ii) formatted in accordance with a legacy Bluetooth wireless communication protocol (e.g., the Bluetooth v2.0+EDR wireless communication protocol) are referred to herein as BT legacy packets (e.g., a BR GFSK packet, an EDR 8-DPSK packet, or an EDR π/4+DQPSK packet).

A packet encoded and formatted for use in a BUX communication mode, referred to herein as a BUX packet, can use a format similar to formats specified in a Bluetooth wireless communication protocol. For example, a BUX packet can use a format similar to the Bluetooth BR packet format 600 or the Bluetooth EDR packet format 608 illustrated in FIGS. 6A and 6B. BUX packets formatted using the Bluetooth BR packet format 600 are referred to herein as BR BUX packets, and BUX packets formatted using the Bluetooth EDR packet format 608 are referred to herein as EDR BUX packets. In some embodiments, a BUX packet can be identified by a dedicated access code (AC) value, referred to as a BUX AC. The BUX AC can differ from an AC value defined in a Bluetooth wireless communication protocol. In some embodiments, different BUX AC values can be used to distinguish BR BUX packets from EDR BUX packets. In some embodiments, the slave device can derive a BUX AC and can send the BUX AC to the master device during communication negotiation. In some embodiments, the BUX AC can be created in accordance with a Bluetooth wireless communication protocol excluding the slave device's Bluetooth address (BD_ADDR).

FIG. 7A shows a table 700 that defines exemplary BUX packet types that can be used in link control. In some embodiments, the BUX packet types defined in table 700 can be resemble BT legacy packet types with the following differences: (1) a packet type name and (2) a type of forward error correction (FEC) encoding used for the BUX packet type. Column 702 identifies three different BUX packet types. A BUX packet type can be named by adding an identifying suffice, e.g., "-B," to a corresponding packet type specified in a legacy Bluetooth wireless communication protocol. For example, a poll packet type can be designated as "POLL" in the Bluetooth v2.0+EDR protocol, while a corresponding BUX poll packet type can be designated as "POLL-B." Column 704 identifies an FEC type used for each BUX packet type. As discussed herein, BUX packets can be encoded using a different FEC encoding that is used for BT legacy packets. In this regard, column 704 indicates that a BUX packet type will be encoded in accordance with a "BUX" FEC encoding, whereas an equivalent table for a Bluetooth wireless communication protocol can specify an FEC rate, e.g., a rate of 1/3 or 2/3 encoding. FIG. 7B shows a table 706 that includes exemplary Asynchronous Connection-Less (ACL) BUX packet types and Extended Synchronous Connection (eSCO) BUX packet types. Similar to table 700 in FIG. 7A, the BUX packet types defined in table 706 of FIG. 7B can differ from equivalent BT legacy packet types by name and by FEC encoding.

FIG. 7C shows a table 708 that illustrates an exemplary BUX logical transport for SCO, eSCO, and ACL operations. In some embodiments, the BUX logical transport illustrated in table 708 can resemble an equivalent table as specified in a legacy Bluetooth wireless communication protocol but can differ in naming convention and by the type of packets used. In this regard, the BUX packets types identified in table 700 and table 706 can be included in table 708.

Figure 8:
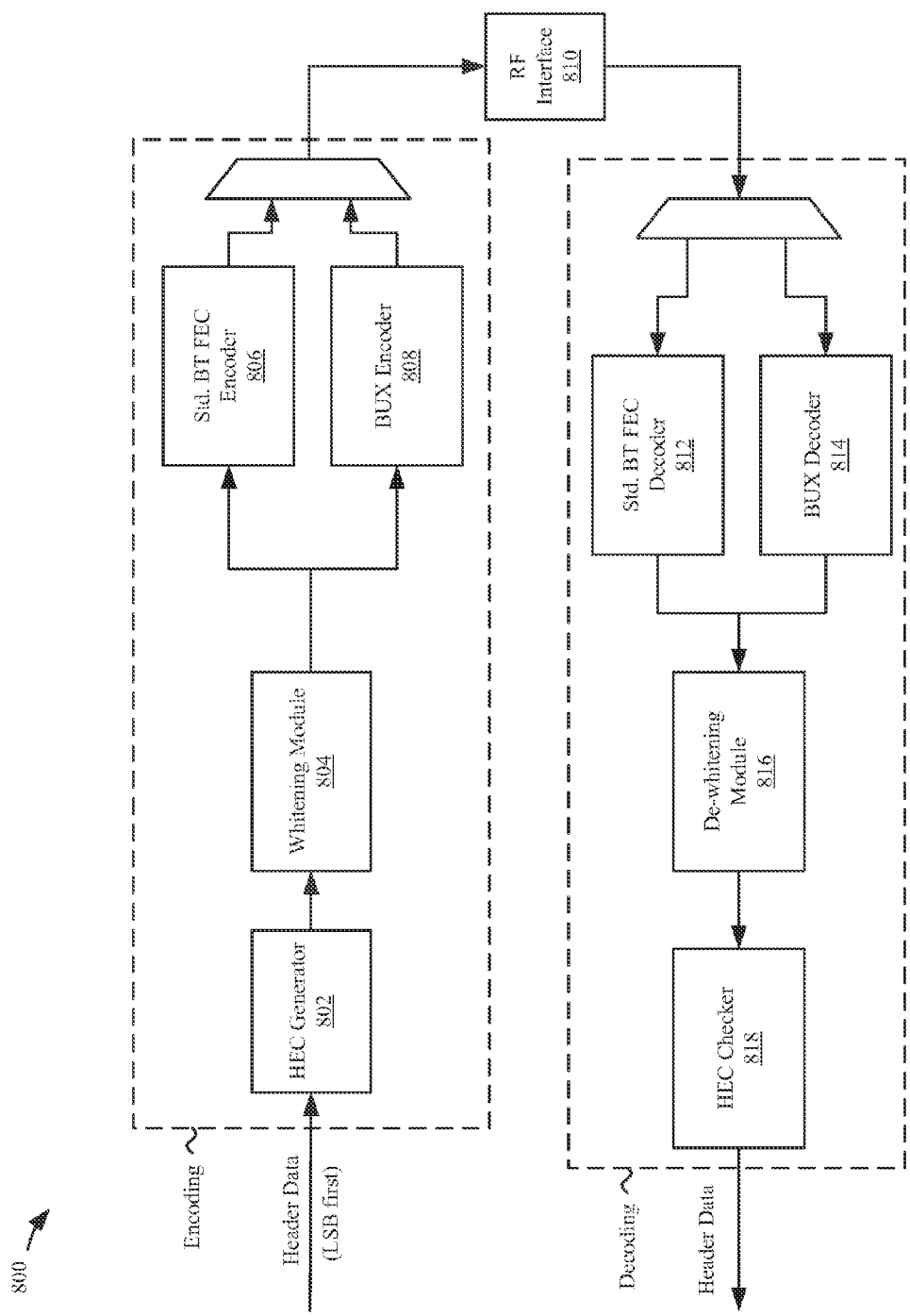
FIG. 8 illustrates a block diagram of exemplary header data processing operations in accordance with some embodiments.

FIG. 8 illustrates a block diagram 800 of exemplary header encoding and decoding operations in accordance with some embodiments. While a BUX packet can use a format similar to a BT legacy packet, e.g., the Bluetooth BR packet format 600 or the Bluetooth EDR packet format 608, a BUX packet can be encoded differently. In particular, the header of a BUX packet can be encoded differently from a BT legacy packet. The header encoding operation can be performed by a combination of hardware circuitry and/or software modules operational in a transmitting device e.g., the first wireless device 102. Similarly, the header decoding operation can be performed by a combination of hardware circuitry and/or software modules operational in a receiving device, e.g., the second wireless device 104.

Header error check (HEC) generator 802 receives header data and adds a HEC to the header data. Next, a whitening module 804 performs a data whitening operation on the header data to randomize the header bits. Randomization of the header data can reduce highly repetitive data and minimize DC bias. Next, the whitened header data is input into either a "standard" Bluetooth forward error correction (FEC) encoder 806 or a BUX encoder 808, depending on whether the header data is to be associated with a BT legacy packet or a BUX packet. When the header data is intended for a BT legacy packet, the header data is input into the FEC encoder 806. The FEC encoder 806 can perform FEC encoding operations in accordance with a Bluetooth wireless communication protocol. For example, a Bluetooth wireless communication protocol can specify that the FEC encoder 806 encode the header with a rate 1/3 FEC repetition code. In another example, another Bluetooth wireless communication protocol can specify that the FEC encoder 806 use a rate 2/3 FEC Hamming code. When the header data is intended for a BUX packet, the BUX encoder 808 can perform a forward error-correcting code operation on the header data that differs from the FEC encoding used for headers of "normal" Bluetooth packets. In some embodiments, the BUX encoder 808 encodes the header bits using a convolutional encoder.

After the header data is encoded, a packet that includes the encoded header data is transmitted, via a radio frequency (RF) interface 810, to the second wireless device 104 where the received packet undergoes a decoding operation. As previously discussed, an AC having an access code value, e.g., a BUX AC value, can be included in the packet. The AC can indicate whether the packet is a legacy BT packet or a BUX packet. The second wireless device 104 can check the accompanying AC and perform the appropriate decoding operation based on the packet type identified by the AC. In this regard, if the packet is identified as a BT legacy packet, the received header data is decoded with the FEC decoder 812. If the packet is identified as a BUX packet, the received header data is decoded with the BUX decoder 814. Next, the decoded header data is input into a de-whitening module 816. The de-whitening module 816 can perform an inverse whitening operation with respect to the whitening module 804. Next, the decoded and de-whitened header data is input into an HEC checker 818, which can provide an error checking function using the HEC to determine if the header data has been corrupted during wireless communication from the first wireless device 102 to the second wireless device 104. Finally, the HEC checker 818 can output the header data.

Figure 9:
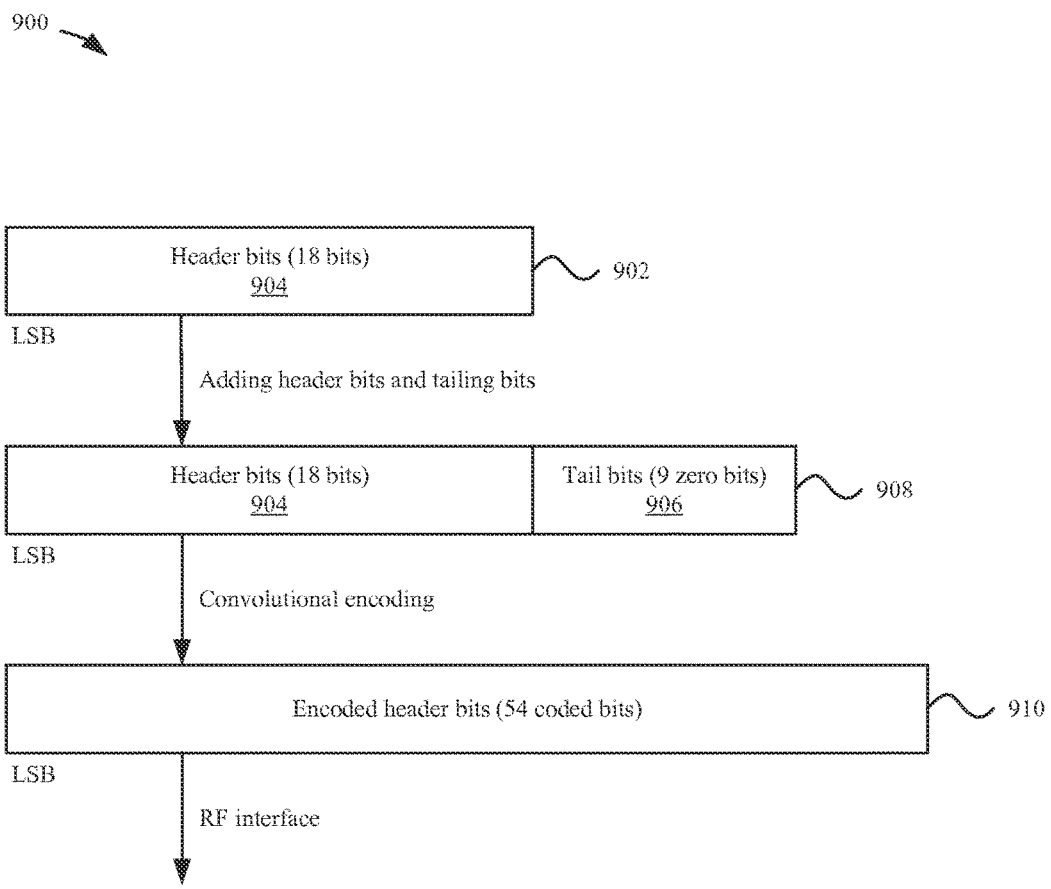
FIG. 9 illustrates an example header data encoding operation in accordance with some embodiments.

FIG. 9 illustrates a diagram 900 of an example header encoding operation performed on a header 902 in accordance with some embodiments. In this regard, the BUX encoder 808 of FIG. 8 can perform the header encoding operation illustrated in FIG. 9. The BUX encoder 808 receives header bits 904. The header bits 904 can have a length of 18 bits. Next, an additional set of tail bits 906 are appended to the header bits 904. In some embodiments, the number of tail bits 906 added to header bits 904 can be based on the desired length for an encoded header 910 resulting from the header encoding operation. For example, the Bluetooth v2.0+EDR protocol specifies a header length of 54 bits. The tail bits 906 can include 9 zero bits, resulting in an extended header 908 having a length of 27 uncoded bits prior to the convolutional encoding operation. In some embodiments, the convolutional encoder operates as a rate 1/2 encoder outputting two encoded bits for each uncoded bit input to the convolutional encoder. In this regard, inputting an extended header 908 with a length of 27 bits into the convolutional encoder will result in an output encoded header 910 having a length of 54 encoded bits.

Figure 10:
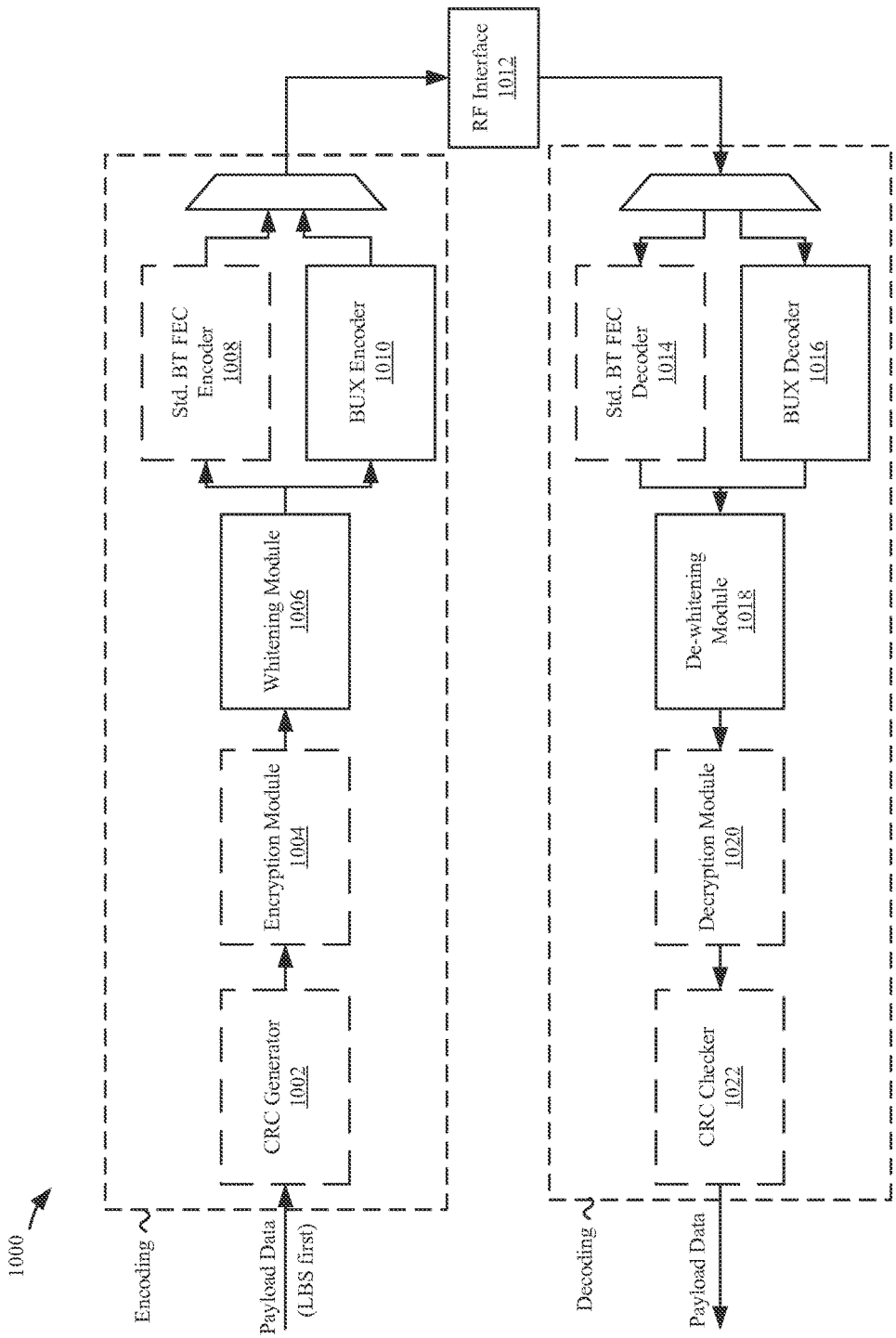
FIG. 10 illustrates a block diagram of example payload data processing operations in accordance with some embodiments.

FIG. 10 illustrates a block diagram 1000 of example payload encoding and decoding operations in accordance with some embodiments. The payload encoding operation can be performed by a combination of hardware circuitry and/or software modules operational in a transmitting device, e.g., the first wireless device 102. Similarly, the payload decoding operation can be performed by a combination of hardware circuitry and/or software modules operational in a receiving device, e.g., the second wireless device 104.

A cyclic redundancy check (CRC) generator 1002 receives the payload data and appends a CRC to the payload data. Next an encryption module 1004 can encrypt the payload data, e.g., using a unique address for the transmitting device and an encryption key. In some embodiments, CRC generation and/or encryption for the payload data can be optional, e.g., based on selected mode of communication. Next, a whitening module 1006 can perform a data whitening operation on the payload data such that it randomizes the payload bits. The payload data can be randomized in order to reduced highly repetitive data and minimize DC bias. Next, the whitened payload data is input into either a standard BT FEC encoder 1008 or a BUX encoder 1010, depending on whether the payload data is intended for a BT legacy packet or a BUX packet. If the payload data is intended for a BT legacy packet, the payload data is input into the standard BT FEC encoder 1008. The standard BT FEC encoder 1008 can perform FEC operations in accordance with a Bluetooth wireless communication protocol. For example, a Bluetooth wireless communication protocol can specify that the standard BT FEC encoder 1008 encode the payload data using a rate 1/3 FEC code. In another example, the Bluetooth wireless communication protocol can specify that the standard BT FEC encoder 1008 use a rate of 2/3 FEC code. When the payload data is intended for a BUX packet, the BUX encoder 1010 can perform an error-correcting code operation on the payload data similar to the BUX encoder 808 used to generate the encoded header 910. In some embodiments, the payload encoding operation can require that the payload data have a smaller maximum user payload size relative to a maximum user payload size for a BT legacy packet.

After the payload data is encoded, a packet including the encoded payload data is transmitted, via an RF interface 1012, to the second wireless device 104 where it undergoes a decoding operation. An AC with a particular AC value, e.g., a BUX AC, can be included with the packet. The AC can indicate whether the packet is a legacy BT packet or a BUX packet. The second wireless device 104 can check the accompanying AC and perform the appropriate decoding operation based on the packet type identified in the AC. In this regard, if the packet is identified as a BT legacy packet, the payload is decoded with a "standard" BT FEC decoder 1014. If the packet is identified as a BUX packet, the payload is decoded with a BUX decoder 1016. Next, the decoded payload data is input into a de-whitening module 1018. The de-whitening module 1018 can perform an inverse whitening operation with respect to the whitening module 1006. In embodiments where the original payload data was encrypted by the transmitting device during the payload encoding operation, a decryption module 1020 can decrypt the payload data. In embodiments where a CRC was generated and appended to the payload data during the payload encoding operation, a CRC checker 1022 can verify the payload data by using the received CRC accompanying the decoded/de-whitened/decrypted payload data.

Figure 11:
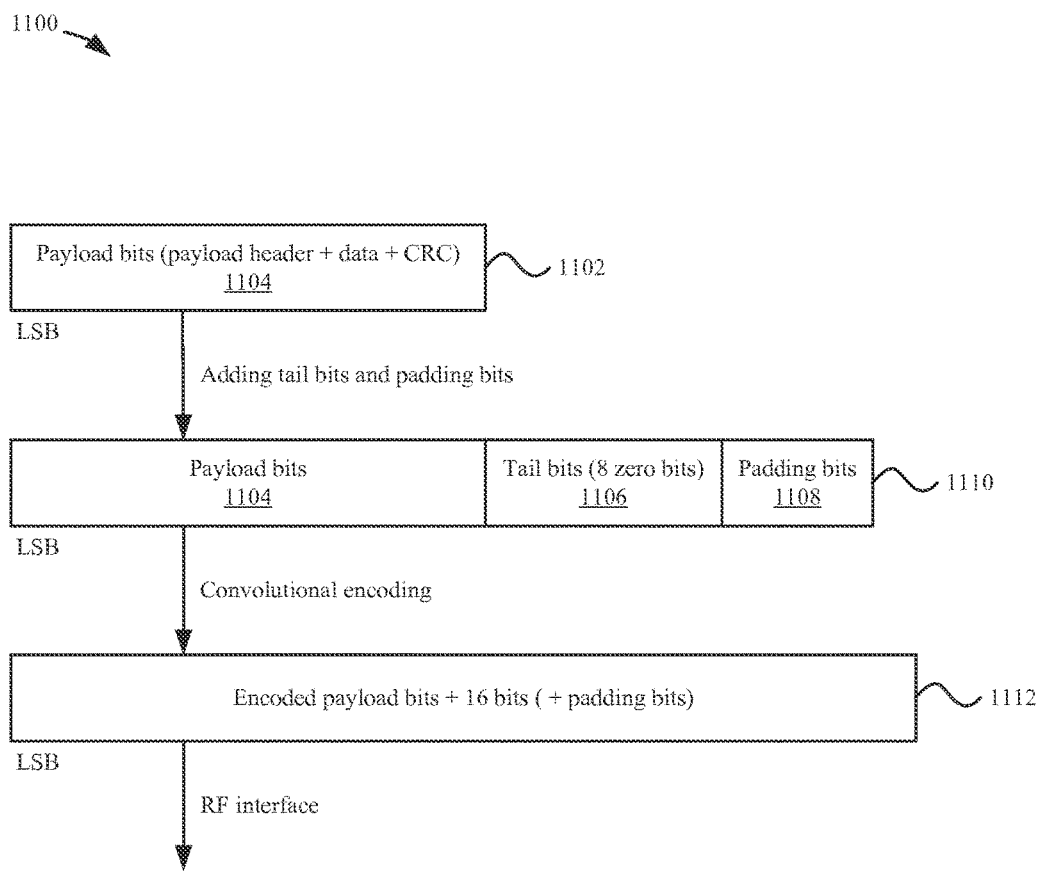
FIG. 11 illustrates an example payload data encoding operation in accordance with some embodiments.

FIG. 11 illustrates a diagram 1100 of an example payload encoding operation performed on a payload 1102 in accordance with some embodiments. In this regard, the payload encoding operation can be performed by the BUX encoder 1010. The BUX encoder 1010 receives a set of payload bits 1104. The payload bits 1104 can include a combination of a payload header, payload data, and a CRC (e.g., the CRC generated by CRC generator 1002). Next, a set of tail bits 1106 are appended to the payload bits 1104. For example, the tail bits 1106 can include 8 zero bits, resulting in an extended payload 1110 having a length of 26 bits prior to a convolutional encoding operation (assuming the payload bits include 18 bits). Optionally, a set of padding bits 1108 can be appended to the payload bits 1104 plus tail bits 1106 when the payload bits do not have sufficient length, i.e., for shorter payloads. For example, when the sum of the payload bits 1104 and the tail bits 1106 has a length less than 72 bits, then the set of padding bits 1108 can be added to the extended payload bits 1104 and tail bits 1106 such that the entire extended payload 1110 has a length of 72 bits. In some embodiments, the padding bits 1108 can include a series of alternating bits, e.g., 0101010101.

Next, a convolutional encoding operation is performed on the extended payload 1110 resulting in an encoded payload 1112. The encoding operation can be performed by the BUX encoder 1010. In some embodiments, the convolutional encoder can use a rate 1/2 encoder resulting in an encoded output having a bit length twice the bit length of the input. In this regard, inputting an extended payload 110 having a length of 72 bits into the convolutional encoder will result in an output of an encoded payload having a length of 144 bits. In some embodiments, the padding bits 1108 and the tail bits 1106 are not included in specifying the length of the payload, and only the payload bits 1104 are used to set a value for a payload length field.

Figure 12:
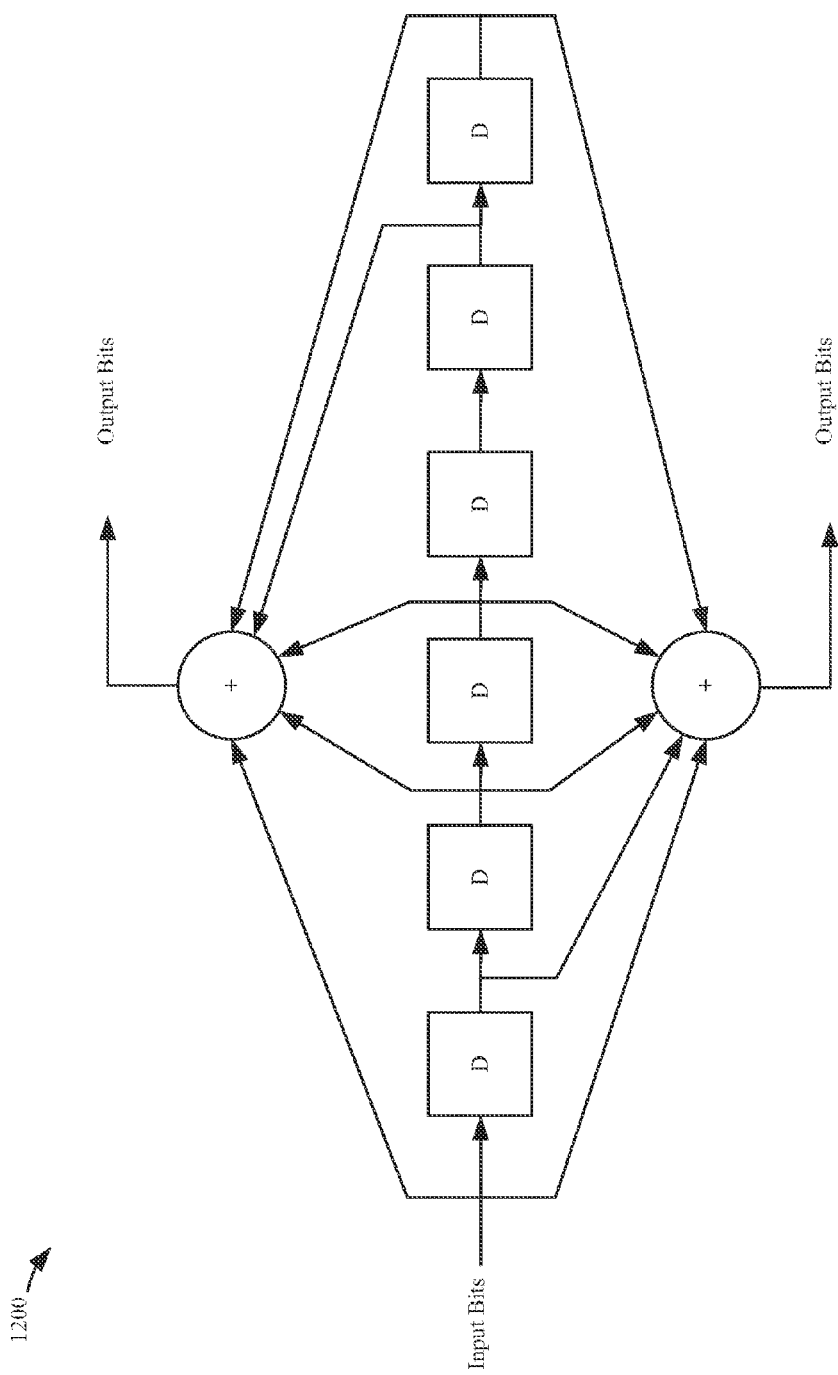
FIG. 12 illustrates a block diagram of an example convolutional encoder in accordance with some embodiments.

FIG. 12 illustrates a diagram of an example convolutional encoder 1200 in accordance with some embodiments. In this regard, the convolutional encoder 1200 can be performed by a combination of hardware circuitry and/or software included in the BUX encoder 808 used to encode the header and/or the BUX encoder 1010 used to encode the payload. In some embodiments, the convolutional encoder 1200 can use a convolutional code having a coding rate of 1/2, i.e., two bits output from the convolutional encoder 1200 for each bit input to the convolutional encoder 1200. In some embodiments, the initial state of the convolutional encoder 1200 can be set to have all zeroes in the storage elements. In some embodiments, the convolutional encoder 1200 can use the generator polynomials g0=1138 and g1=1718. The convolutional encoding and decoding of the headers and the payloads can result in an improvement in link margin for a wireless communication link, e.g., provide a higher level of coding gain relative to an existing BT wireless communication protocol's coding scheme. For example, a BUX BR mode that utilizes a rate 1/2 convolutional encoding provides a packet error rate (PER) link margin of 7.9 dB with respect to an uncoded BR GFSK mode. As another example, a BUX EDR π/4+DQPSK mode that utilizes a rate 1/2 convolutional encoding improves the PER link margin by 5.1 dB with respect to an uncoded EDR π/4+DQPSK mode.

Figure 13:
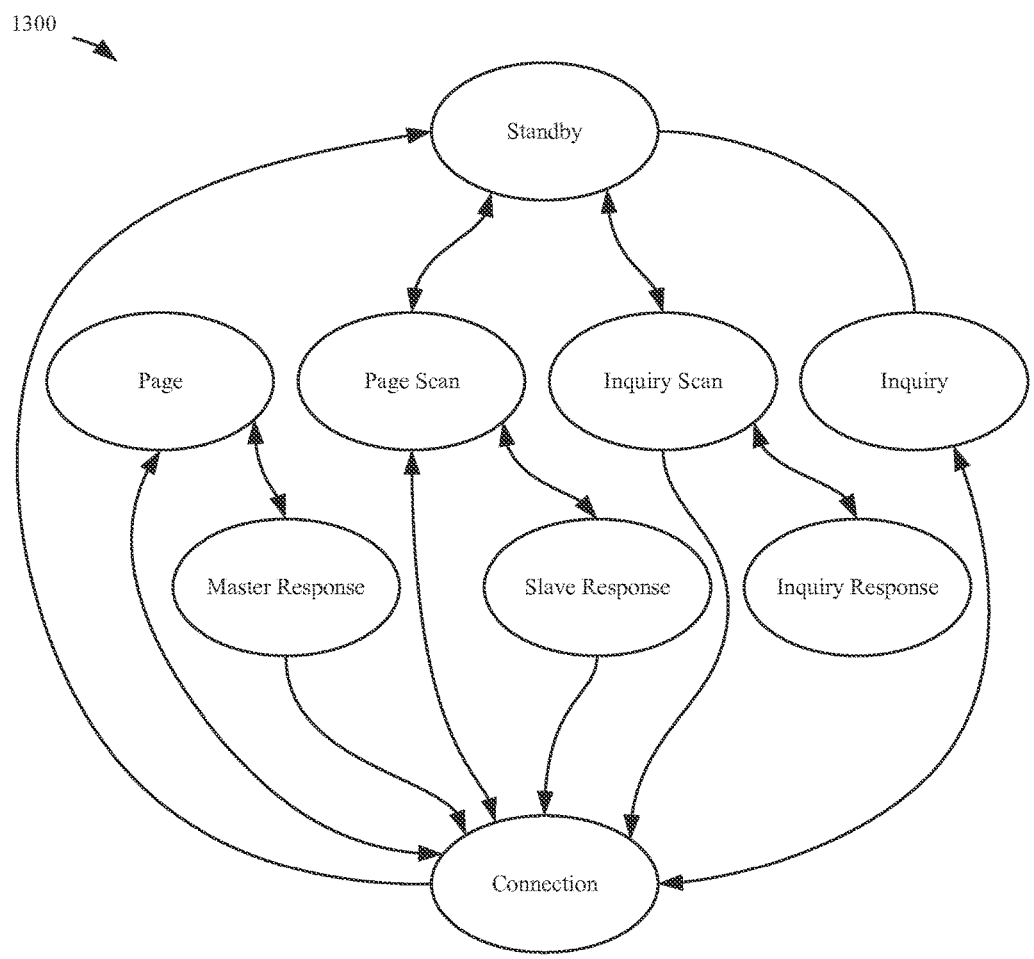
FIG. 13 illustrates an example state diagram in accordance with some embodiments.

FIG. 13 shows an example state transition diagram 1300 used to facilitate link controller operations between a master device and a slave device in accordance with a Bluetooth wireless communication protocol. In this regard, the first wireless device 102 operating as a master device and the second wireless device 104 operating as a slave device can communicate in accordance with the state transition diagram 1300. In some embodiments, the first wireless device 102 can be in a Page state while the second wireless device 104 can be in a Page Scan state. While in the Page Scan state, the second wireless device 104 can listen at a single hop frequency with its access code (AC) correlator matched to either it's device access code (DAC) or to a BUX AC during a scan window. In this regard, the second wireless device 104 can listen for pages transmitted by the first wireless device 102 and intended for the second wireless device 104. The transmitted pages can be coded in accordance with a BT legacy mode or in accordance with a BUX mode.

In some embodiments, while in the Page state, the first wireless device 102 can attempt to page the second wireless device 104. During one or more of the transmitted paging attempts, the second wireless device 104 can be in a Page Scan state, i.e., during a scan window in which the second wireless device 104 scans for paging messages. The first wireless device 102 can attempt to coincide with the second wireless device's scan window by repeatedly transmitting page messages, hopping among different frequency channels. In a representative embodiment, the second wireless device 104 can scan (listen) for paging messages at a single hop frequency during the scan window. The transmitted page messages can include either the wireless device's 104 DAC or a BUX AC. In some embodiments, the BUX AC included in the page message can have a BUX AC value that was previously communicated during negotiations of a pairing process between the first wireless device 102 and the second wireless device 104. For example, the wireless devices can negotiate a BUX AC value to use for communication between them during a pairing operation between the wireless devices.

In some embodiments, the second wireless device 104 can enter a Slave Response state from the Page Scan state, e.g., in response to receiving a page message from the first wireless device 102. While in the Slave Response state, the second wireless device 104 attempts to re-connect to the first wireless device 102. In response to receiving a first BUX packet, e.g., a BUX POLL-B packet, from the first wireless device 102, the second wireless device 104 can send a second BUX packet to the first wireless device 102. When the first wireless device 102 acknowledges receipt of the second BUX packet, the second wireless device 104 can use BUX packets only (rather than legacy BT packets) for all subsequent link management protocol (LMP) messages, BUX activation communication, and communication during a BUX activated connection mode of operation. The exchange between the first wireless device 102 and the second wireless device 104 of a first BUX packet (from the master to the slave) and a second BUX packet (from the slave to the master) and a final acknowledgement (from the master to the slave) can provide for protecting the connection establishment procedure to enter the BUX mode appropriately.

In some embodiments, the first wireless device 102 can be in a Master Response state. While in the Master Response state, the first wireless device 102 can receive a slave response packet from the second wireless device 104. The slave response packet can identify the second wireless device 104. For example, the packet can include the second wireless device's DAC or a BUX AC associated with the second wireless device 104. In response to receiving the slave response packet that includes the second wireless device's identifier (ID), the first wireless device 102 can send to the second wireless device 104 a BUX frequency hopping synchronization (FHS) packet, e.g., a FHS-B packet, thus protecting the connection establishment procedure when operating in a BUX communication mode. The first wireless device 102 can then send a BUX POLL-B packet to the second wireless device 104 confirming connection establishment between the BUX supporting wireless devices. When the first wireless device 102 receives confirmation from the second wireless device 104, e.g., the second wireless device 104 responds to the POLL-B packet, the POLL-B and NULL-B packets are used only for BUX activation or during a BUX activated connection.

In some embodiments, polling during an active communication mode between two BUX supporting wireless devices that have an established BUX connection is performed using one of the packets listed in table 708 of FIG. 7C, except for the FHS-B and ID packets.

Figure 14A:
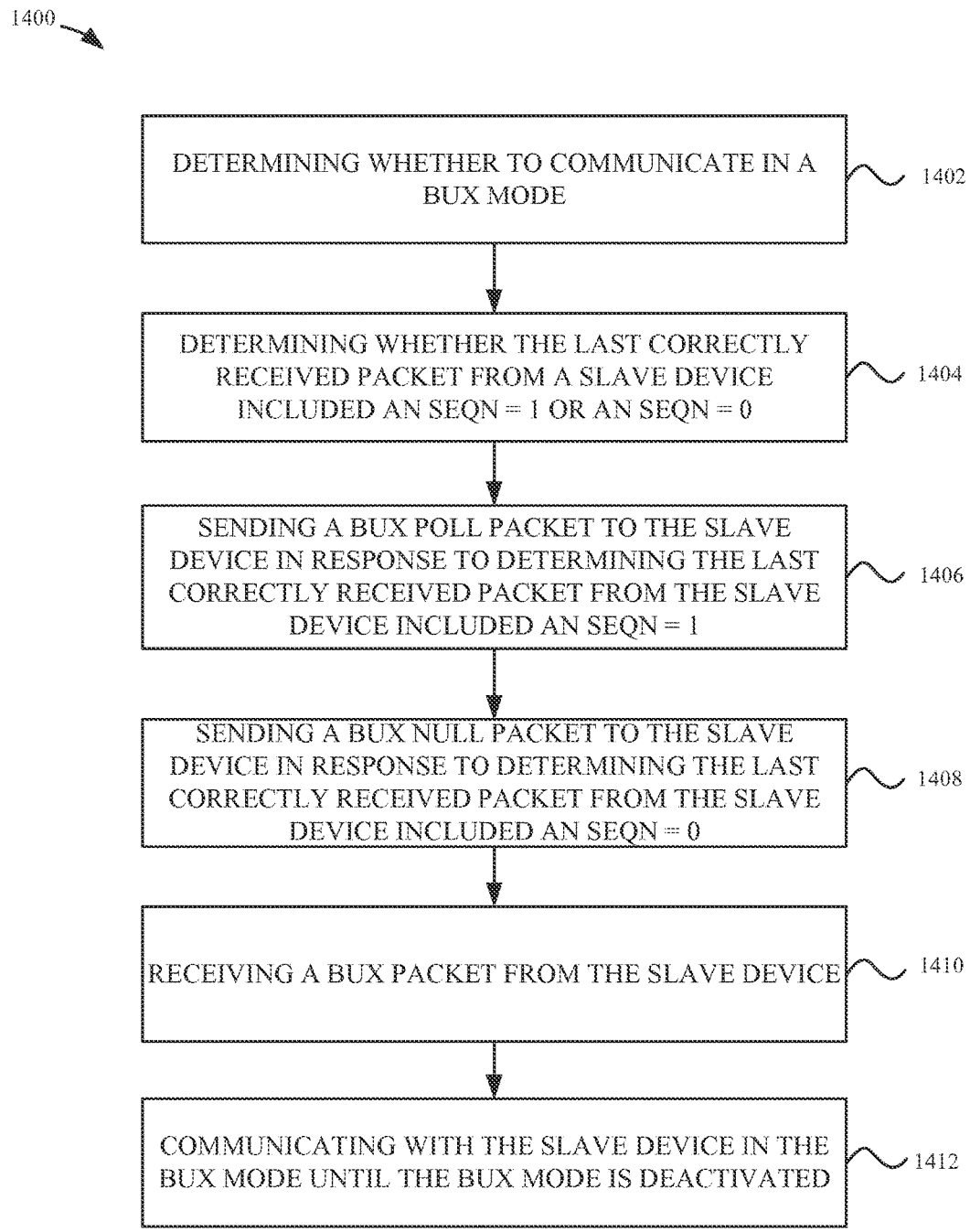
FIGS. 14A to 14C illustrate flow charts of example methods for activating a mode of communications in accordance with some embodiments.

FIG. 14A illustrates a flow chart 1400 of an example method for activating a BUX mode initiated by a master device in accordance with some embodiments. In this regard, FIG. 14 illustrates steps that can be performed by the first wireless device 102 to initiate BUX mode activation in accordance with various embodiments. Prior to performing the steps in FIG. 14A, the first wireless device 102 can communicate with the second wireless device 104 in a BT legacy mode. Step 1402 can include the first wireless device 102 determining whether to communicate in a BUX mode with the second wireless device 104. The determination can be based on detecting a loss of signal quality in the wireless communication link 106 established between the first wireless device 102 and the second wireless device 104. In some embodiments, BUX mode activation can be initiated by sending a BUX POLL packet or a BUX NULL packet. For example, the BUX POLL packet can be the POLL-B packet listed in table 700. Similarly, the BUX NULL packet can be the NULL-B packet listed in table 700. Accordingly, a BUX activation packet can refer to a BUX POLL packet or a BUX NULL packet.

Step 1404 can include determining whether the last correctly received packet from the second wireless device 104 included a header having a sequence number (SEQN) field with a value of SEQN=1 or a value of SEQN=0 (The SEQN field can be used to determine that packets are received in the correct order and can alternate between a "0" value and a "1" value for a 1-bit SEQN field.). At step 1406, the first wireless device 102 can send a BUX POLL packet (as a BUX mode activation packet) to the second wireless device 104 in response to determining the last correctly received packet from the second wireless device 104 included an SEQN=1. Alternatively, at step 1408, the first wireless device 102 can send a BUX NULL packet (as the BUX mode activation packet) to the second wireless device 104 in response to determining the last correctly received packet from the second wireless device 104 included an SEQN=0. Step 1410 can include receiving a BUX packet, e.g., a BUX NULL packet, from the second wireless device 104. The receipt of the BUX packet can indicate that the second wireless device 104 received the BUX mode activation packet sent in step 1406 or step 1408 and is agreeing to BUX mode activation. Step 1412 can include communicating with the second wireless device 104 in the BUX mode until the BUX mode is deactivated.

Figure 14B:
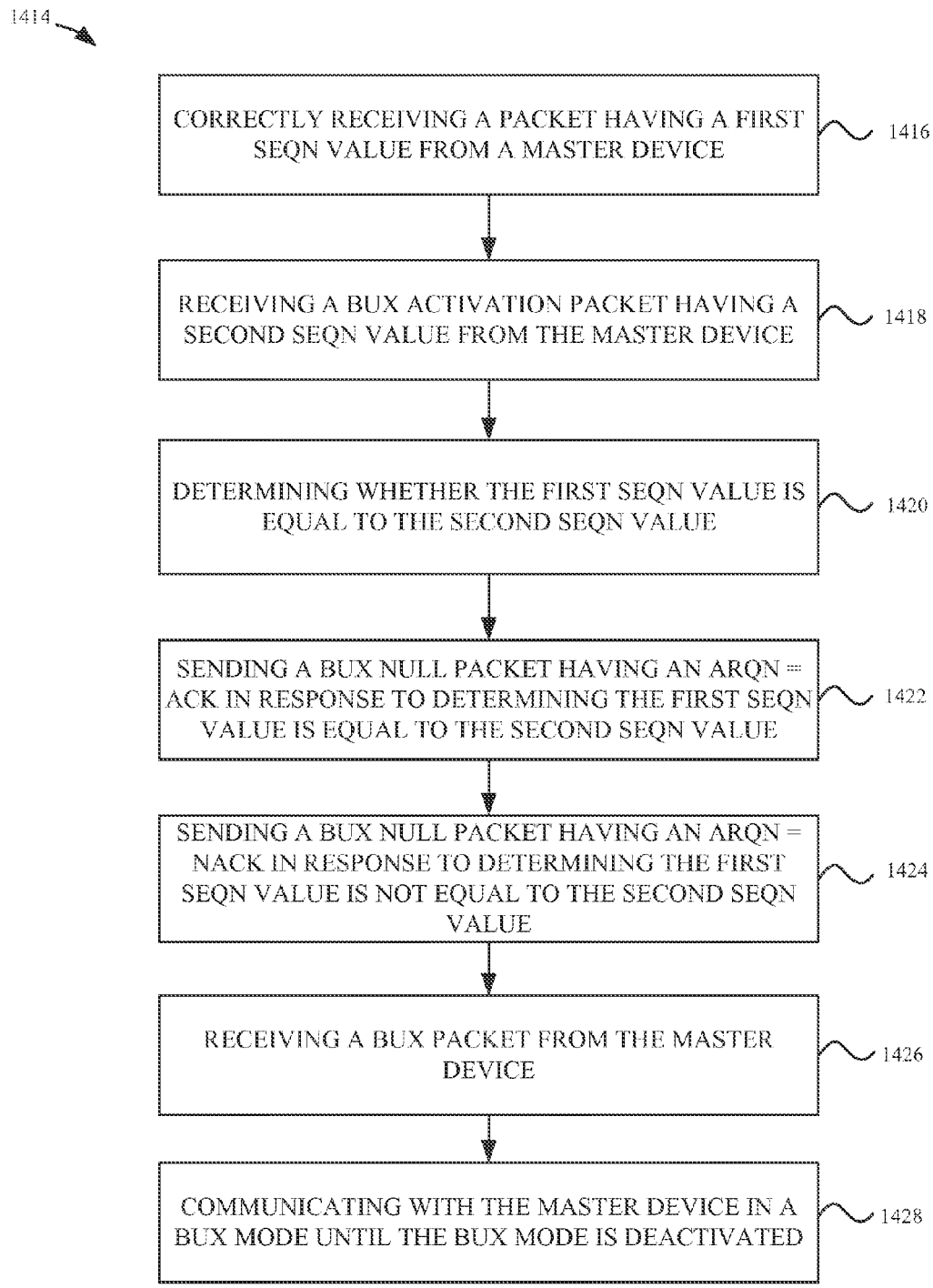

FIG. 14B illustrates a flow chart 1414 of an example method for activating a BUX mode at a slave device, the BUX mode being initiated by a master device in accordance with some embodiments. In this regard, FIG. 14B illustrates steps that can be performed by the second wireless device 104 in response to BUX mode activation initiated by the first wireless device 102 in accordance with various embodiments. Prior to performing the steps in FIG. 14B, the second wireless device 104 can communicate with the first wireless device 102 in a BT legacy mode. Step 1416 can include the second wireless device 104 correctly receiving, from the first wireless device 102, a packet having a first SEQN value (e.g., either SEQN=1 or SEQN=0). Next, step 1418 can include receiving, from the first wireless device 102, a BUX activation packet that includes a second SEQN value. The BUX activation packet can indicate that the first wireless device 102 desires to activate a BUX mode. At step 1420, the second wireless device 104 can determine whether the first SEQN value (for the last packet correctly received by the second wireless device 104 from the first wireless device) and the second SEQN value (for the BUX activation packet) are equal. An acknowledgement indication (ARQN) value in a response from the second wireless device 104 to the first wireless device 102 can be set to ACK or NACK based on whether the first and SEQN values are equal or not. At step 1422, the second wireless device 104 can send a BUX packet, e.g., a BUX NULL packet, to the first wireless device 102 in response to determining that the first SEQN value is equal to the second SEQN value, the BUX NULL packet including an ARQN=ACK. Alternatively, at step 1424, the second wireless device 104 can send a BUX NULL packet having an ARQN=NACK to the first wireless device 102 in response to determining the first SEQN value is not equal to the second SEQN value. Step 1426 can include receiving a BUX packet from the first wireless device 102. The receipt of the BUX packet at 1426 can indicate that the first wireless device 102 received the BUX NULL packet sent in step 1422 or step 1424 and is confirming BUX mode activation. Step 1428 can include communicating with the first wireless device 102 in BUX mode using BUX coded packets until the BUX mode is deactivated.

Figure 14C:
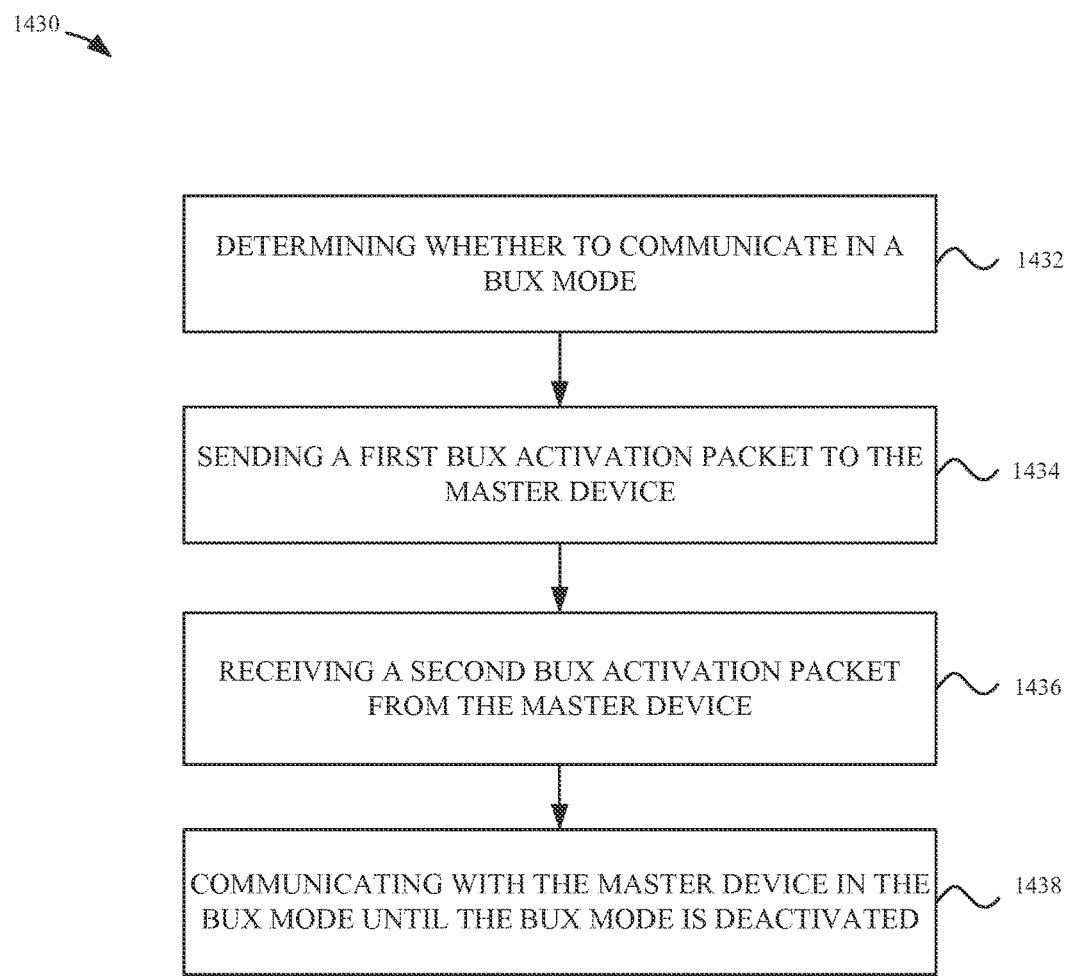

FIG. 14C illustrates a flow chart 1430 of an example method for activating a BUX mode initiated by a slave device in accordance with some embodiments. In this regard, FIG. 14C illustrates steps that can be performed by the second wireless device 104 to initiate the BUX mode with the first wireless device 102 in accordance with various embodiments. Prior to performing the steps in FIG. 14C, the second wireless device 104 can communicate with the first wireless device 102 in a BT legacy mode. Step 1432 can include the second wireless device 104 determining whether to communicate using the BUX mode with the first wireless device 102. The determination can be based on detecting a loss of signal quality in the communication link 106 between the first wireless device 102 and the second wireless device 104. Next at step 1434, the second wireless device 104 can send a first BUX activation packet to the first wireless device 102. For example, the second wireless device 104 can send a BUX NULL packet to the first wireless device 102. Step 1436 can include the second wireless device 104 receiving a second BUX activation packet from the first wireless device 102, indicating the first wireless device 102 confirms BUX mode activation. The type of BUX packet used for the second BUX activation packet received from the first wireless device 102 can be vary, e.g., a BUX POLL packet or a BUX NULL packet, in accordance with the embodiments described for steps 1404-1408 outlined in FIG. 14A. In this regard, the type of BUX activation packet the second wireless device 104 receives from the first wireless device 102 can be based on prior packets that the second wireless device 104 sent to the first wireless device 102. Step 1438 can include the second wireless device 102 communicating with the first wireless device 102 in the BUX mode until the BUX mode is deactivated. In some embodiments, after a BUX connection is established, the first and second wireless devices 102/104 can transmit LMP messages using BUX encoded 2-DH1 packets.

Figure 15A:
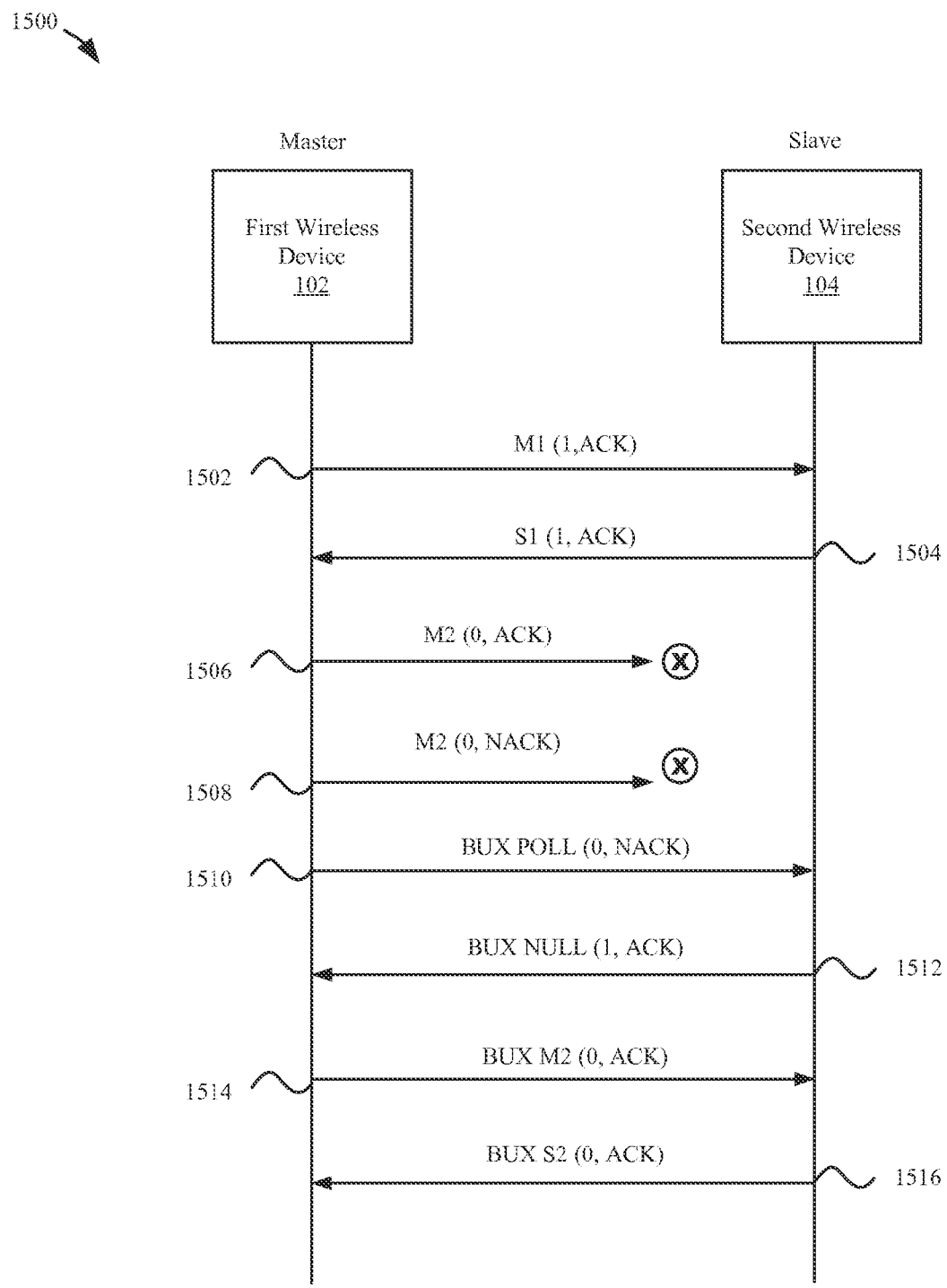
FIGS. 15A and 15B illustrate ladder diagrams of example methods for wireless devices activating a mode of communication in accordance with some embodiments.

FIG. 15A shows a ladder diagram 1500 illustrating a first example method for activation of a BUX mode initiated by a master device in accordance with some embodiments. In this regard, the method can be carried out by the first wireless device 102 and the second wireless device 104 over the wireless communication link 106. For the purposes of illustration, each packet shown in diagram 1500 is represented by a packet identifier, e.g., M1, followed by a SEQN value and an ARQN value in parentheses, e.g., (1, ACK). The SEQN value and the ARQN value are included in the associated packet. Packets originating from the "master" first wireless device 102 can be denoted by an "M#" indication, while packets originating from the "slave" second wireless device 104 can be denoted with an "S#" indication in FIG. 15A.

At 1502 the first wireless device 102 can send a first "master" packet (denoted as "M1"), to the second wireless device 104, including an SEQN=1 and an ARQN=ACK. Similarly at 1504, the second wireless device 104 can send to the first wireless device 102 a first "slave" packet (denoted as "S1"). The S1 packet can include an SEQN=1 and an ARQN=ACK. The M1 and the S1 packets can be transmitted using a BT legacy communication mode. At 1506, the first wireless device 102 attempts to send a second "master" packet (denoted as "M2") to the second wireless device 104. The M2 packet can include an SEQN=0 and an ARQN=ACK. As illustrated in FIG. 15A, the attempt to send the M2 packet can be unsuccessful, i.e., the second wireless device 104 can be unable to successfully receive the M2 packet or the M2 packet can be "lost" in transmission.

At 1508, the first wireless device 102 can attempt to resend the M2 packet to the second wireless device 104 again. In the second attempt, the M2 packet can include an SEQN=0 and an ARQN=NACK. As shown in FIG. 15A, the second attempt to transmit the M2 packet to the second wireless device 104 can also be unsuccessful. The attempts to send the M2 packet to the second wireless device 104 can be unsuccessful due to poor link signal quality for the communication link 106 between the first and second wireless devices 102/104. The first wireless device 102 can conclude based on receiving no acknowledgement to the M2 packets from the second wireless device 104 that the communication link 106 cannot support the BT legacy mode and can attempt to activate a BUX mode, which can provide for communicating under adverse conditions when the "normal" BT legacy mode may not operate properly. At 1510, the first wireless device 102 requests to activate a BUX mode by sending a BUX POLL packet to the second wireless device 104. As described for FIG. 14A, the first wireless device 102 can send a BUX POLL packet to activate the BUX mode in response to a last correctly received slave packet from the second wireless device 104 having an SEQN=1 (e.g., the S1 packet). (If the last correctly received slave packet from the second wireless device 104 had a value of SEQN=0, then the first wireless device 102 would send a BUX NULL packet to initiate activation of the BUX mode.) The BUX POLL packet sent by the first wireless device 102 to the second wireless device 104 can have an SEQN=0 and an ARQN=NACK. As shown in FIG. 15A, the SEQN value of the BUX POLL packet sent by the first wireless device 102 can be the same as the SEQN value used for the most recently send master packets, i.e., the M2 packets (SEQN=0) sent previously (which were not acknowledged by the second wireless device 104). The last master packet successfully received by the second wireless device 104 (the M1 packet) and acknowledged to the first wireless device 102 (via the S1 packet) included an SEQN value of 1.

In response to receiving the BUX POLL(0, NACK) packet from the first wireless device 102, the second wireless device 104 can respond positively to activating a BUX mode by sending a BUX NULL packet having an SEQN=1 and an ARQN=ACK at 1512 to the first wireless device 102. The second wireless device 104 sends the BUX NULL packet having an SEQN that corresponds to the SEQN of the last packet sent by the second wireless device 104, which in this case is SEQN=1 as indicated for the S1 packet sent by the second wireless device 104 at 1504. In addition, the BUX NULL packet sent by the second wireless device 104 at 1512 includes an ARQN=ACK in response to receiving the BUX POLL packet with an SEQN=0 as expected (having previously acknowledged the SEQN=1 at 1504). As shown in FIG. 15A, the previously received M1 packet, sent at 1502, includes an SEQN=1, which was successfully acknowledged by the second wireless device 104 to the first wireless device 102 at 1504. The first wireless device 102, having received the S1(1, ACK) packet toggles it's SEQN value to "0" as used for the two subsequent M2 packets (not successfully received by the second wireless device 104) and for the BUX POLL packet, which is successfully received by the second wireless device 104. After 1512, the BUX mode is activated, and the wireless devices 102/104 can send packets to each other using the BUX mode. The first wireless device 102 can send to the second wireless device 104 a BUX encoded second master packet (BUX M2) having an SEQN=0 and an ARQN=ACK to the second wireless device 104 at 1514, and the second wireless device 104 can respond by sending to the first wireless device 102 a BUX encoded second slave packet (BUX S2) having an SEQN=0 and an ARQN=ACK at 1516.

Figure 15B:
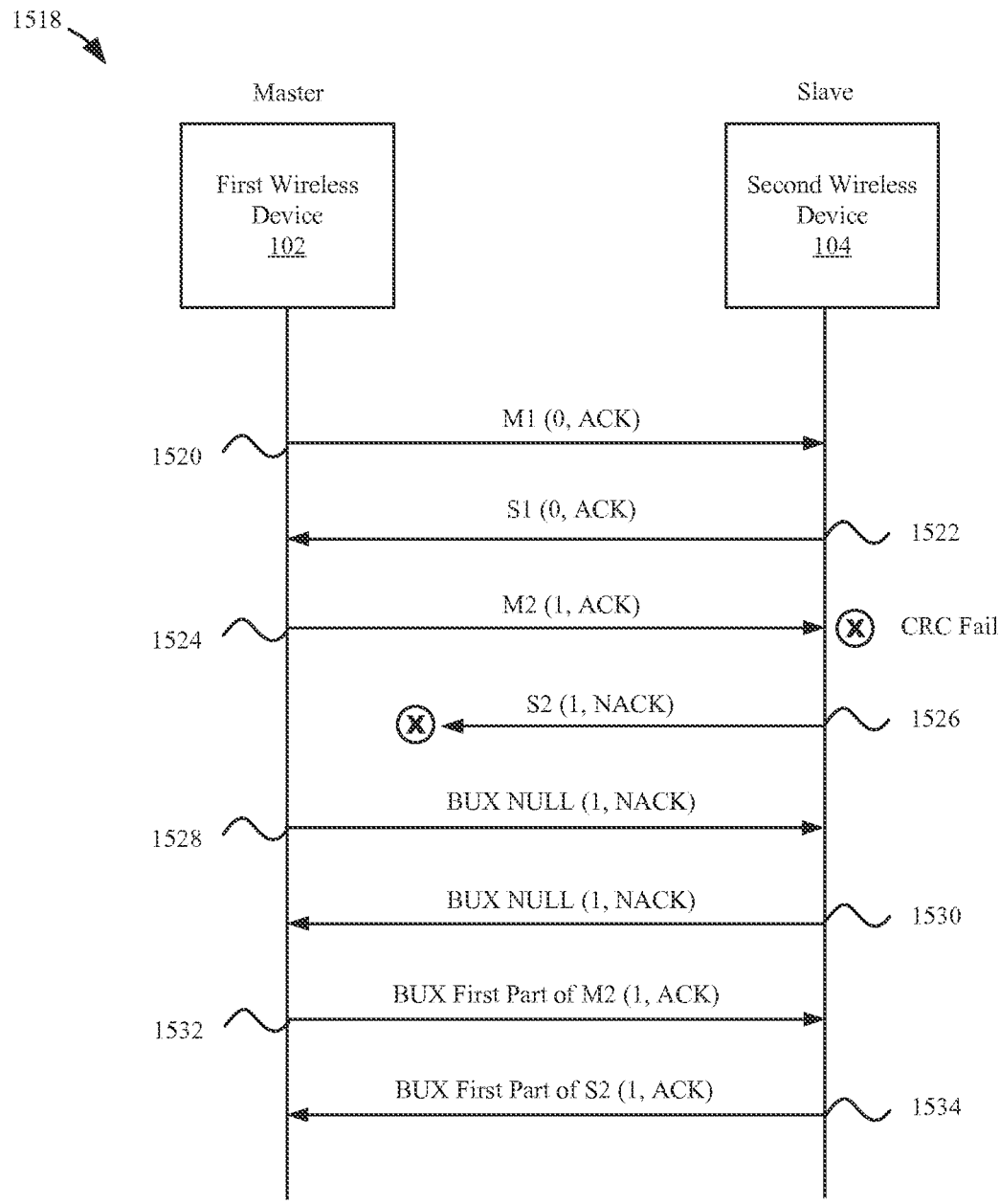

FIG. 15B shows a ladder diagram 1518 illustrating a second example method for activation of a BUX mode initiated by a master device in accordance with some embodiments. In this regard, the method can be carried out by the first wireless device 102 and by the second wireless device 104 over the wireless communication link 106. At 1520, the first wireless device 102 can send a first master packet (M1) to the second wireless device 104, the M1 packet having an SEQN=0 and an ARQN=ACK. The second wireless device 104 can send a first slave packet (S1) to the first wireless device 102 at 1522. The S1 packet can have an SEQN=0 and an ARQN=ACK. The M1 packet and the S1 packet can be transmitted using a BT legacy communication mode. At 1524, the first wireless device 102 can send a second master packet (M2) to the second wireless device 104; however the transmission of the M2 packet results in a CRC failure detected by the second wireless device 104. At 1526, the second wireless device 104 attempts to send a second slave packet (S2) having an SEQN=1 and an ARQN=NACK to the first wireless device 102 to indicate that the M2 packet was not received correctly by the second wireless device 104. As illustrated in FIG. 15B, the first wireless device 102 does not successfully receive the S2 packet. The CRC failure detected by the second wireless device 104 for the M2 packet sent by the first wireless device 102 at 1524, and the unsuccessful communication of the S2 packet from the second wireless device 104 to the first wireless device 102 at 1526 can indicate that the wireless communication link 106 between the wireless devices has deteriorated, e.g., signal quality can be too poor to communicate packets successfully using a legacy BT communication mode. The poor signal quality can result in corruption of data that produces CRC failures or impedes the communication of packets altogether. The "master" first wireless device 102 can initiate a BUX communication mode to provide for effective communication under the poor signal quality conditions.

At 1528, the first wireless device 102 requests to activate a BUX mode by sending to the second wireless device 104 a BUX NULL packet. As described for FIG. 14A, the first wireless device 102 can send a BUX NULL packet to activate the BUX mode when the last slave packet correctly received by the master first wireless device 102 has an SEQN=0 (e.g., the S1 packet). The BUX NULL packet can include an SEQN=1 and an ARQN=NACK. In some embodiments, the SEQN value of the BUX NULL packet at 1524 can equal the SEQN value for the last master packet that the first wireless device 102 transmitted (i.e., the SEQN value for the BUX NULL packet matches the SEQN value included in the M2 packet). In response to receiving the BUX NULL packet, the second wireless device 104 can send a BUX NULL packet to the first wireless device 102 having an SEQN=1 and an ARQN=NACK at 1530. As described for FIG. 14B, the second wireless device 104 sends a BUX NULL packet having an ARQN=NACK when the SEQN value of the last packet from the first wireless device 102 correctly received by the second wireless device 104 (e.g., the SEQN value included in the M1 packet, which includes SEQN=0) does not equal the SEQN value of the BUX activation packet (e.g., the BUX NULL packet sent at 1528 includes SEQN=1). In the particular scenario illustrated in FIG. 15B, the M1 packet has an SEQN value of 0 and the BUX NULL packet sent by the first wireless device 102 to initiate the BUX mode has an SEQN value of 1. As the two SEQN values are not equal, the slave second wireless device 104 responds with a packet having an ARQN=NACK. After 1530, the BUX mode is activated, and the first and second wireless devices 102/104 can send messages using the BUX mode. Communication in the BUX mode can include the first wireless device 102 sending a first part of the M2 packet with BUX encoding (BUX First Part of M2) having an SEQN=1 and an ARQN=ACK to the second wireless device 104 at 1532. The BUX First Part of M2 packet can include a portion of the M2 packet. In this regard, the first wireless device 102 re-transmits a portion of the last failed packet that it attempted to send (i.e., the M2 packet). The SEQN value for the BUX First Part of M2 packet is set to "1", as the last successfully transmitted data packet from the master first wireless device 102 to the slave second wireless device 104 was the M1 packet having an SEQN value of "0." The second wireless device 104 can send a BUX encoded packet (denoted as BUX First Part of S2) that includes a first part of the S2 packet previously sent by the second wireless device 104 (but not successfully received by the first wireless device 102). The BUX encoded packet sent by the second wireless device 104 to the first wireless device 102 (BUX First Part of S2) includes an SEQN=1 and an ARQN=ACK at 1534. The BUX First Part of S2 packet can include a portion of the S2 packet. In this regard, the second wireless device 104 retransmits a portion of the last failed data packet that it attempted to send (i.e., the S2 packet) to the first wireless device 102.

Figure 16:
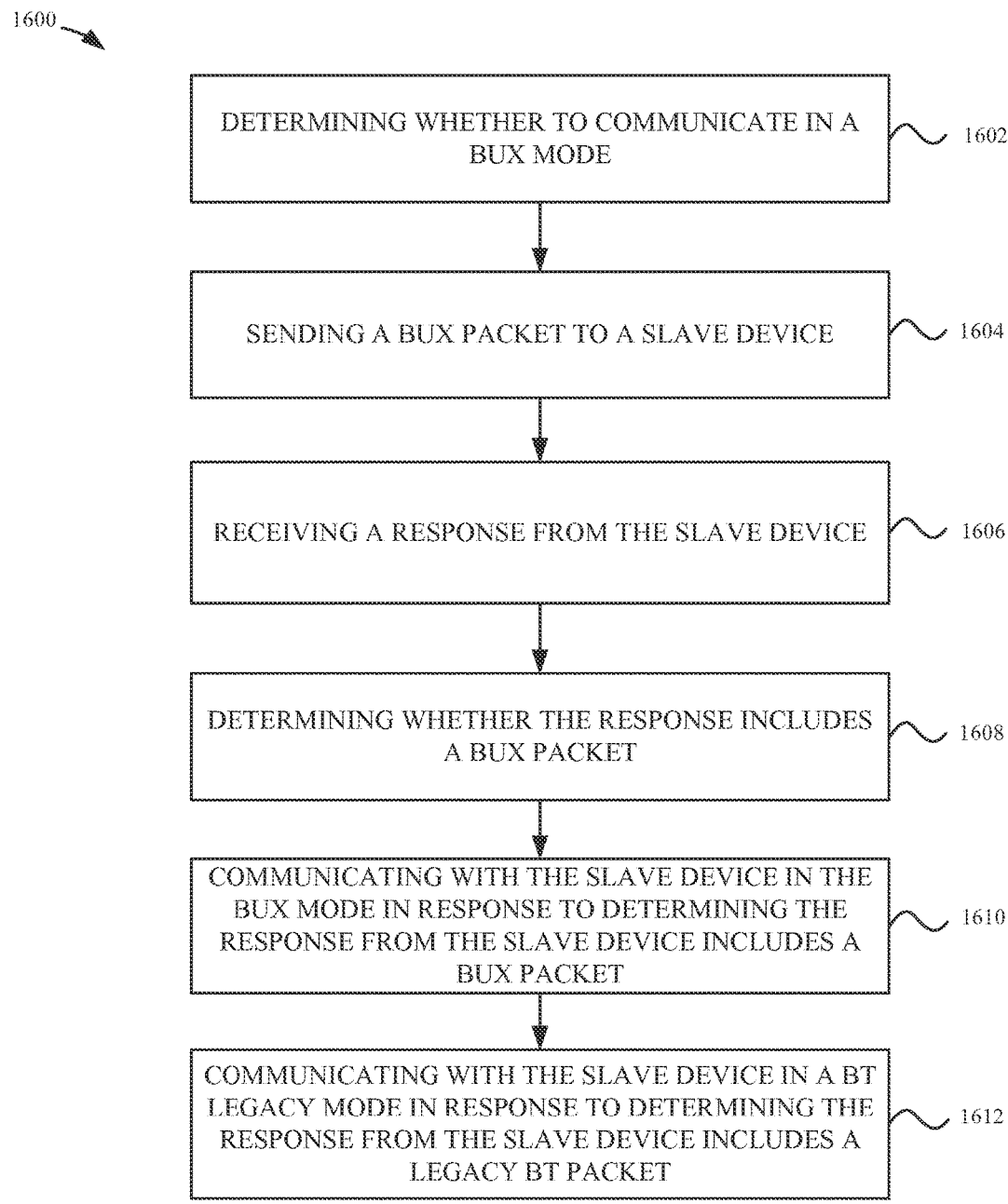
FIG. 16 illustrates a flow chart of an example method for changing a mode of communications in accordance with some embodiments.

FIG. 16 illustrates a flow chart 1600 of an example method for activating a BUX mode while in an enhanced synchronous connection-oriented (eSCO) link is active in accordance with some embodiments. The eSCO link can be used for voice communication between wireless BT devices. In this regard, FIG. 16 illustrates steps that can be performed by the first wireless device 102 in accordance with various embodiments. Although the following description describes the method performed by the first wireless device 102, it can be appreciated that method can also be performed by the second wireless device 104 in other embodiments. In this regard, the master device or the slave device can perform the method of FIG. 16 to activate the BUX mode of communication between them.

Prior to performing the steps in FIG. 16, the first wireless device 102 can communicate with the second wireless device 104 in a BT legacy mode. Step 1602 can include the first wireless device 102 determining whether to communicate in a BUX mode with the second wireless device 104. The determination can be based on detecting a loss of signal quality in the communication link 106 between them. The steps illustrated in FIG. 16 can apply to a scenario in which an eSCO connection exists between the first and second wireless devices 102/104, when one of them decides to initiate the BUX mode. Step 1604 can include, upon determining that the BUX mode should be activated, the first wireless device 102 (master device) sends a BUX packet to the second wireless device 104 (slave device). (Alternatively the slave second wireless device 104 can send a BUX encoded packet to the master first wireless device 102 to activate the BUX mode.) The BUX packet can be any type of BUX packet used to carry eSCO data. For example, the BUX mode packet can be a 2-EV3-B packet or a 2-EV5-B packet listed in table 706 of FIG. 7B and table 708 of FIG. 7C. In some embodiments, the first and second wireless devices 102/104 can switch between using BT legacy packets and BUX packets without the need to renegotiate the eSCO connection as long as the packet's slot occupancy does not change. For example, when the first and second wireless devices 102/104 are in an eSCO connection using a hands free profile (HFP), the first and second wireless devices 102/104 can use 2-EV5 packets (normal legacy BT packets) or 2-EV5-B packets (BUX encoded packets) every 15 ms to communicate voice data. This allows the controller of each wireless device to activate the BUX mode without the need to renegotiate the eSCO connection's packet types. Accordingly, the controller of each wireless device can communicate using 2-EV5-B packets to communicate voice data.

At step 1606, the first wireless device 102 receives a response from the second wireless device 104. The response can include a BUX packet or a BT legacy packet. At step 1608 the first wireless device 102 determines whether the response includes a BUX packet. Next, the first wireless device 102 communicates with the second wireless device 104 in the BUX mode at step 1610 in response to determining the response included a BUX packet. Alternatively, at step 1612, the first wireless device 102 communicates with the second wireless device 104 in a BT legacy mode in response to determining the response received at step 1606 includes a BT legacy packet. When the second wireless device 104 agrees to use the BUX mode, the second wireless device 104 responds to the first wireless device 102 with a BUX packet. When the second wireless device 104 does not agree to use the BUX mode, the second wireless device 104 responds to the first wireless device 102 with a BT legacy packet. A wireless device that sent a BUX packet to activate a BUX mode and receives a BT legacy packet as an acknowledgement can conclude that the BUX activation failed and should return to transmitting BT legacy packets rather than BUX encoded packets.

Figure 17:
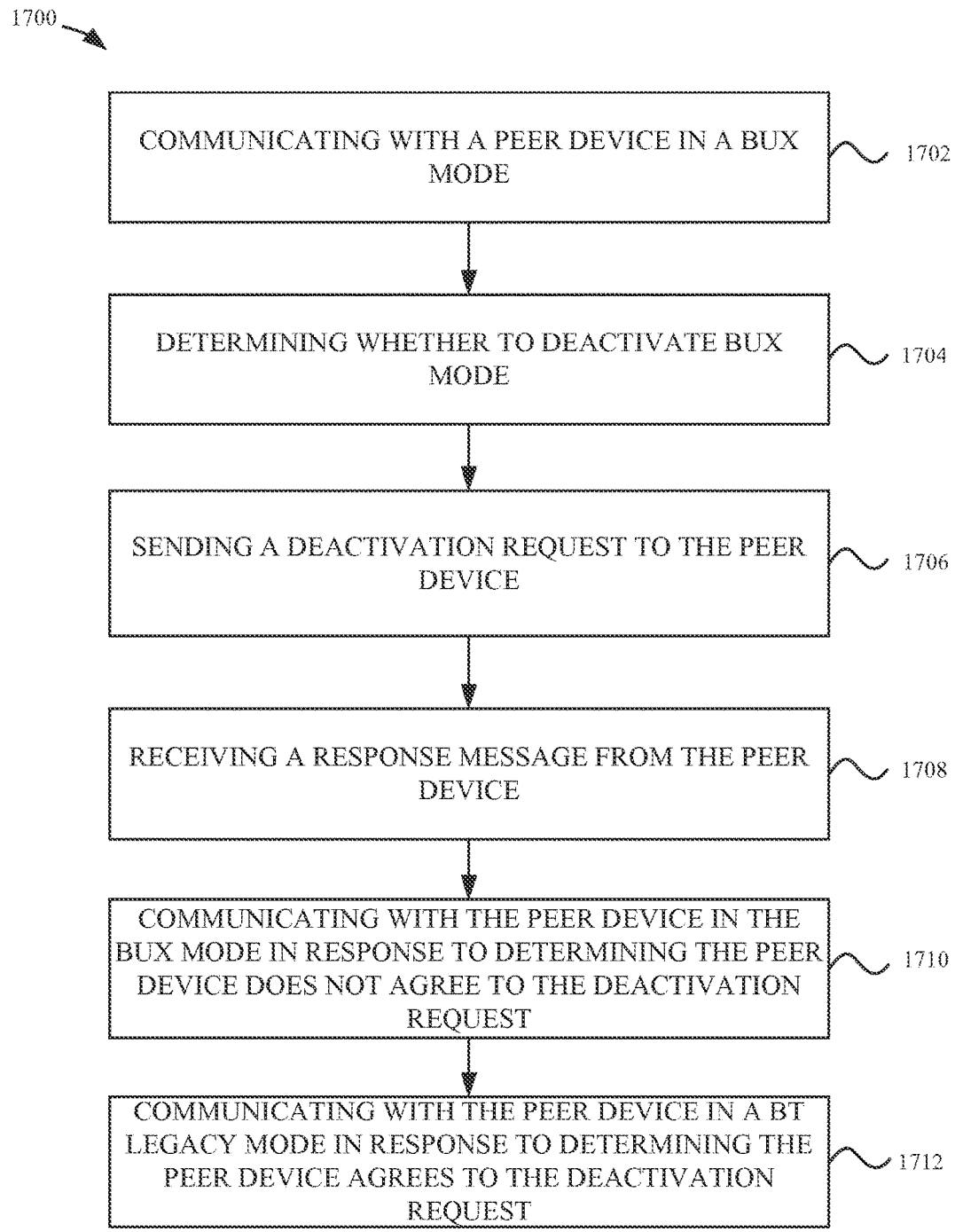
FIG. 17 illustrates a flow chart of an example method for deactivating a mode of communications in accordance with some embodiments.

FIG. 17 illustrates a flow chart 1700 of an example method for deactivating a BUX mode in accordance with some embodiments. In this regard, FIG. 17 illustrates steps that can be performed by the first wireless device 102 and/or the second wireless device 104 in accordance with various embodiments. Although the following describes the method performed by the first wireless device 102, a similar method can also be performed by the second wireless device 104 in some embodiments. In this regard, the method of FIG. 17 can be performed by a master device (e.g., the first wireless device 102) or by a slave device (e.g., the second wireless device 104). When changing from using a BUX mode of communication to using a legacy BT mode of communication, both wireless devices must agree to the change.

Step 1702 can include the first wireless device 102 communicating with the second wireless device 104 in a BUX mode. Step 1704 can include the first wireless device 102 determining whether to deactivate BUX mode communication with the second wireless device 104. The determination can be based on detecting an improvement in signal quality in the wireless communication link 106. At step 1706, upon determining the BUX mode may be deactivated, the first wireless device 102 can send a deactivation request to the second wireless device 104. The deactivation request can include a LMP_BUX_CONTROL packet that includes a enable/disable field set to "disable" and a second field that includes a "connection handle".

Step 1708 includes the first wireless device 102 receiving a response from the second wireless device 104. The response message can include an indication that the second wireless device 104 agrees to the deactivation request received from the first wireless device 102, e.g., the response includes a LMP_BUX_CONTROL (Disable, Connection Handle) packet, or an indication that the second wireless device 104 does not agree to the deactivation request, e.g., the response includes a LMP_BUX_CONTROL (Enable, Connection Handle) packet. At step 1710, the first wireless device 102 continues to communicate with the second wireless device 104 in the BUX mode in response to receiving a packet that included an indication that the second wireless device 104 did not agree to the deactivation request. Alternatively, at step 1712, the first wireless device 102 starts to communicate with the second wireless device 104 in a BT legacy mode in response to receiving a packet that included an indication the second wireless device 104 agrees to the deactivation request. In some embodiments, in which the wireless devices communicate with each other via an eSCO connection, the wireless devices can switch between using BUX packets and BT legacy packets without the need to renegotiate the eSCO connection as long as the packet's slot occupancy does not change. For an asynchronous connection-less (ACL) link, the wireless devices must agree to changes between using a legacy BT mode of communication and using a BUX mode of communication.

Figure 18A:
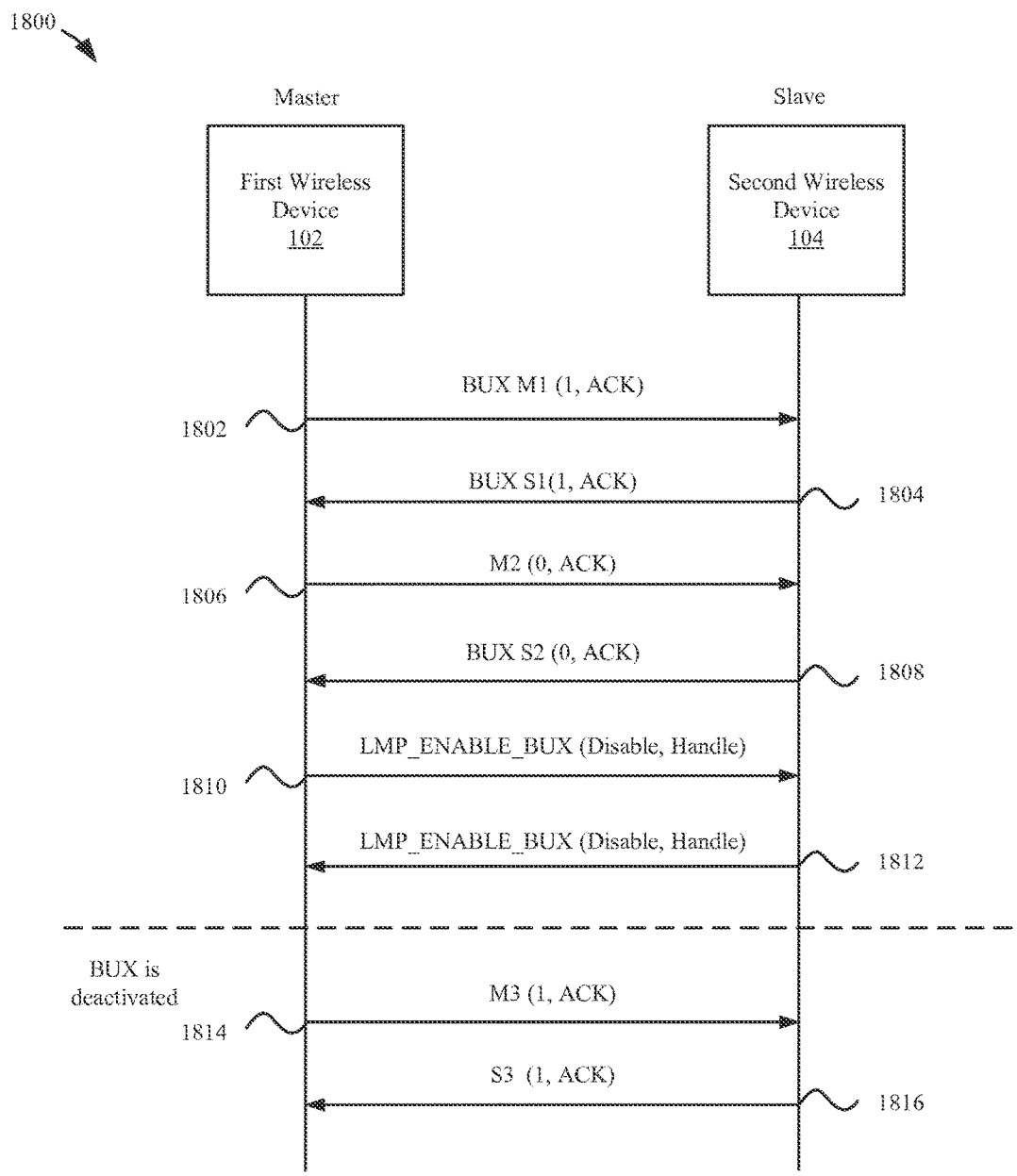
FIGS. 18A and 18B illustrate ladder diagrams of example scenarios for wireless devices deactivating a mode of communication in accordance with some embodiments.

FIG. 18A shows a ladder diagram 1800 representing an example scenario in which deactivation of a BUX mode is initiated by a master device, in accordance with some embodiments. In this regard, the method illustrated by the example scenario of FIG. 18A can be carried out by the first wireless device 102 and the second wireless device 104 over the wireless communication link 106. At 1802, the first wireless device 102 can send a BUX first master packet (BUX M1) having an SEQN=1 and an ARQN=ACK to the second wireless device 104. The second wireless device 104, in response, can send a BUX first slave packet (BUX S1) to the first wireless device 102 at 1804. The BUX S1 packet can have an SEQN=1 and an ARQN=ACK indicating correct reception of the BUX M1 packet by the second wireless device 104. At 1806 the first wireless device 102 can send a second master packet (M2) to the second wireless device 104. The M2 packet can use a legacy BT mode rather than a BUX encoded mode. At 1808, the second wireless device 104 can send a BUX second slave packet (BUX S2) having an SEQN=0 and an ARQN=ACK to the first wireless device 102 indicating correct reception of the legacy BT mode M2 packet. As the second wireless device 104 indicated correct reception of a legacy BT mode packet, the first wireless device 102 can seek to change the communication link between the first wireless device 102 and the second wireless device 104 from using the BUX mode to using the legacy BT mode.

At 1810, the first wireless device 102 can send a deactivation request to the second wireless device 104. The deactivation request can indicate a request to deactivate BUX mode communication between the first and second wireless device 102 and the second wireless device 104. The deactivation request can include an LMP_ENABLE_BUX (Disable, Handle) packet. In response to receiving the deactivation request, the second wireless device 104 can send a response to the first wireless device 102 at 1812. The response can include an indication that the second wireless device 104 agrees to deactivate the BUX mode. For example, the response from the second wireless device 104 to the first wireless device 102 can include an LMP_ENABLE_BUX (Disable, Handle) packet. When the slave second wireless device 104 confirms to the master first wireless device 102 that deactivation of BUX mode is accepted, data can be subsequently be sent using legacy BT packets. After 1812, BUX mode is deactivated as indicated in FIG. 18A by the dotted line. Accordingly, the wireless devices can communicate via a BT legacy mode. This can include the first wireless device 102 sending a third master packet (M3) having an SEQN=1 and an ARQN=ACK to the second wireless device 104 at 1814, and the second wireless device 104 sending a third slave packet (S3) having an SEQN=1 and an ARQN=ACK to the first wireless device 102 at 1816. The M3 and S3 packets are sent as legacy BT packets. The M3 packet includes a SEQN=1 value as the last data packet correctly received by the second wireless device 104 was the M3 packet that had a SEQN=0 value. A wireless device that answers a deactivation request with a deactivation confirmation starts to use legacy BT packets in the following transmit time slot. A wireless device that receives a deactivation confirmation in response to a deactivation request also starts to use legacy BT packets in its following transmit time slot.

Figure 18B:
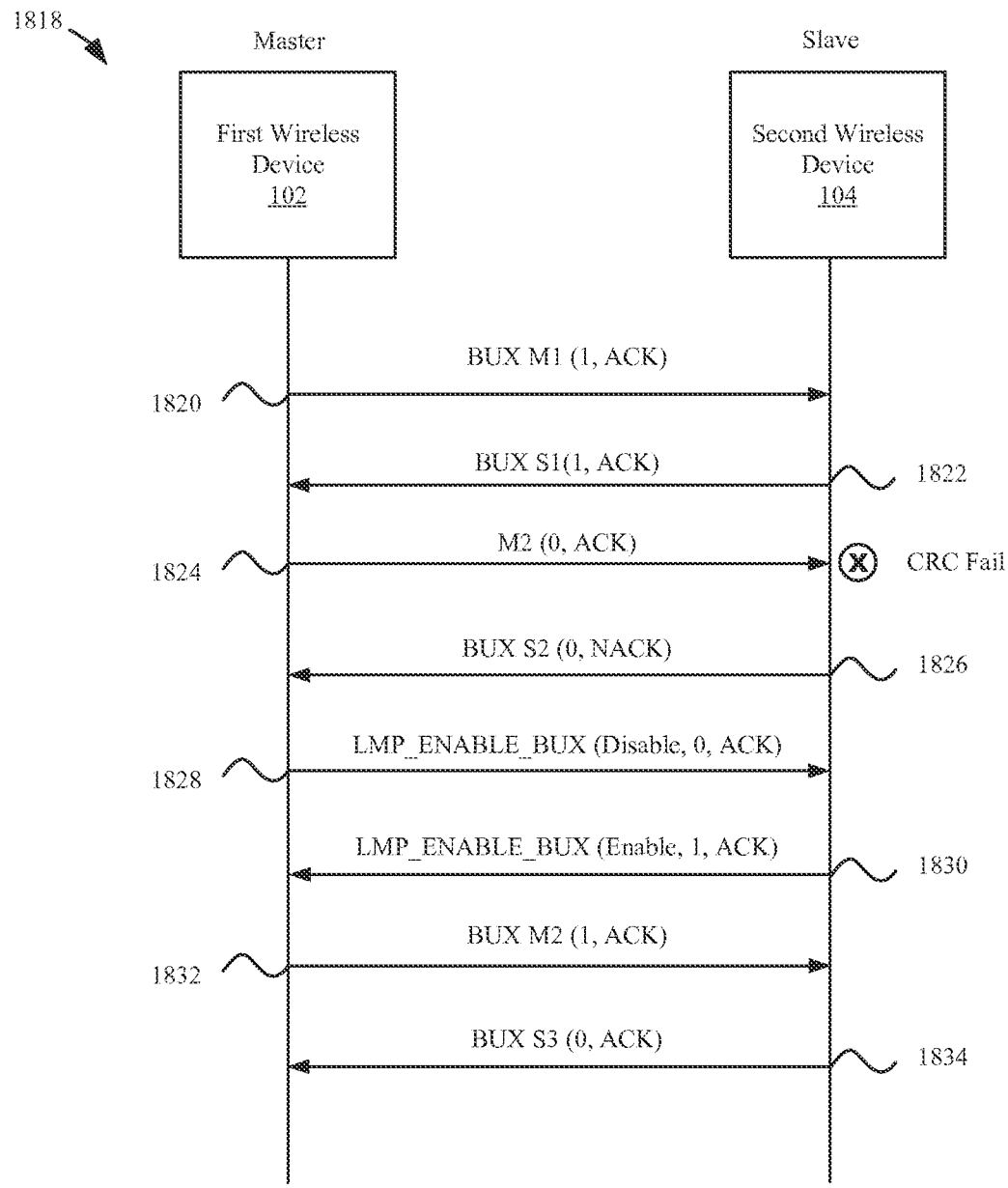

FIG. 18B illustrates a ladder diagram 1818 of an example scenario in which a master device requests to deactivate a BUX mode and a slave device does not agree to deactivating the BUX mode, in accordance with some embodiments. In this regard, the first wireless device 102 and the second wireless device 104 can carry out the example scenario illustrated in FIG. 18B over the wireless communication link 106. At 1820, the first wireless device 102 can send a BUX first master packet (BUX M1) having an SEQN=1 and an ARQN=ACK to the second wireless device 104. In response, the second wireless device 104 can send a BUX first slave packet (BUX S1) to the first wireless device 102 at 1822. The BUX S1 can have an SEQN=1 and an ARQN=NACK. At 1824, the first wireless device 102 can send a second master packet (M2) to the second wireless device 104. The second master packet M2 can use a legacy BT mode rather than a BUX mode. The transmission of the M2 packet using the legacy BT mode can result in a failed CRC detected by the second wireless device 104. The failed CRC can indicate the signal quality of the communication link 106 between the first and second wireless devices 102/104 is not sufficient to support communication in a BT legacy mode (and thus communication in the BUX mode is preferable). At 1826, the second wireless device 104 can send a BUX second slave packet (BUX S2) having an SEQN=0 and an ARQN=NACK to the first wireless device 102. The SEQN number for the BUX S2 slave packet toggles to the "0" value, as the previously transmitted BUX S1 slave packet was acknowledged by the first wireless device 102 in the M2 master packet. The NACK included in the BUX S2 slave packet can indicate to the first wireless device 102 that the second wireless device 104 did not successfully receive the M2 packet (e.g., the CRC failure).

At 1828, the first wireless device 102 can send a deactivation request to the second wireless device 104. The deactivation request can indicate that the first wireless device 102 seeks to deactivate BUX mode communication with the second wireless device 104. The deactivation request can include a LMP_ENABLE_BUX (Disable, SEQN=0, ACK) packet. The ACK can indicate that the first wireless device 102 received the BUX S2 packet sent at 1826. The SEQN number can remain at "0" as the previous M2 packet was not properly received and acknowledge by the second wireless device 104. In response to receiving the deactivation request, the second wireless device 104 can respond to the first wireless device 102 at 1830. The response from the second wireless device 104 can indicate that the second wireless device 104 does not agree to deactivate BUX mode communication with the first wireless device 102. For example, the response can include an LMP_ENABLE_BUX (Enable, SEQN=1, ACK) packet, which indicates that the second wireless device 104 does not want to deactivate BUX mode (i.e., BUX mode remains enabled). The SEQN number toggles to "1", as the previously transmitted BUX S2 packet was acknowledged by the first wireless device 102. After 1830, the first and second wireless devices 102/104 continue to communicate using the BUX mode and do not change to the BT legacy mode requested by the first wireless device 102. Communications can include the first wireless device 102 sending a BUX encoded second master packet (BUX M2) having an SEQN=1 and an ARQN=ACK to the second wireless device 104 at 1832, and the second wireless device 104 sending at 1834 a BUX encoded third slave packet (BUX S3) having an SEQN=0 and an ARQN=ACK to wireless device 102. As the slave second wireless device 104 refused the request to deactivate BUX mode, both the master first wireless device 102 and the slave second wireless device 104 continue to communicate using the BUX mode, i.e., BUX mode remains activated and BUX packets used for communication between the master first wireless device 102 and the slave second wireless device 104 at 1832 and 1834.

The exemplary BUX deactivation scenarios illustrated in FIGS. 18A and 18B can apply to an asynchronous connection-less (ACL) link between the first wireless device 102 and the second wireless device 104. For an eSCO link, each of the peer wireless devices, e.g., the first (master) wireless device 102 and the second (slave) wireless device 104, can deactivate the BUX mode. The wireless device that seeks to deactivate the BUX mode can send a deactivation request to a peer wireless device, which can include an LMP_BUX_CONTROL packet having a "Disable" field value and a "Handle" (or "Connection Handle") field value. The peer wireless device can agree to the deactivation request by answering with an LMP_BUX_CONTROL packet also having a "Disable" field value and a "Handle" (or "Connection Handled") field value. The peer wireless device can instead refuse the deactivation request by answering with an LMP_BUX_CONTROL packet having an "enable" field value and a "Handle" (or "Connection Handle") field value. When the answering wireless device confirms BUX deactivation, the answering wireless device can start to use legacy BT packets in the following eSCO instant. When the requesting wireless device receives confirmation of BUX deactivation, the requesting wireless device can start to use legacy BT packets in the next eSCO instant. In some embodiments, wireless devices can switch between using BUX eSCO packets and legacy BT eSCO packets without the need to renegotiate the eSCO connection between them as long as the packet's slot occupancy does not change.

Figure 19:
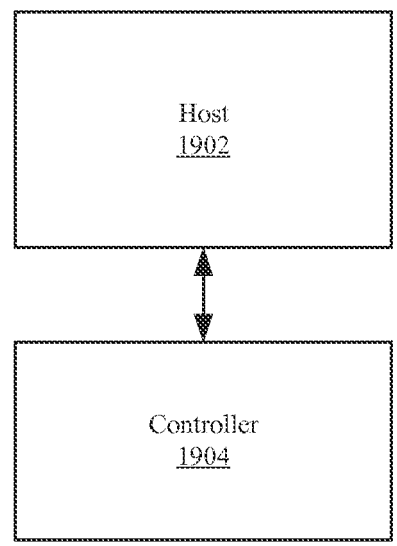
FIG. 19 illustrates a block diagram of an example system in accordance with some embodiments.

FIG. 19 illustrates a block diagram of an example system 1900 that can be implemented in a wireless device in accordance with some embodiments. In this regard, when implemented or included in a wireless device, such as the first wireless device 102 or the second wireless device 104, the system 1900 can enable the wireless device to operate within the wireless system 100 in accordance with one or more embodiments. The system 1900 includes a host 1902 that can communicate with a controller 1904. By way of non-limiting example, the host 1902 can be embodied as a combination of hardware circuitry and/or software operating as a Bluetooth host in a computing device. By way of non-limiting example, the controller 1904 can be embodied as a Bluetooth Universal Serial Bus (USB) dongle, a Bluetooth network interface controller (NIC), or any other apparatus configured to enable the host 1902 to communicate with a peer wireless device in accordance with a Bluetooth wireless communication protocol.

In some embodiments, during controller device initiation, the host 1902 can determine whether the controller 1904 is a BUX capable device, i.e., supports a BUX mode of communication. The determination can include the host 1902 detecting the presence of a bit indicating that a BUX mode is supported by the controller 1904. For example, the bit can be a Controller_BUX_Feature_Bit located in a memory of (and/or associated with) the controller 1904. The system 1900 can be considered to support the BUX mode of communication when both the host 1902 and the controller 1904 support a BUX mode. In some embodiments, a system 1900 that supports a BUX mode can set the Device_BUX_Feature_Bit in the controller 1904 to indicate that the system 1900 is BUX capable. The host 1902 can perform the setting of the Device_BUX_Feature_Bit. The host can also identify itself as a BUX capable host in a device identification (DID) profile.

In some embodiments, the hosts of two wireless devices can share information regarding features and capabilities using DID profiles. The sharing of information can occur after a pairing operation between the two wireless devices. The information shared can include details that indicate whether a wireless device is BUX capable and particular BUX capabilities supported by the wireless device. In some embodiments, the information in a DID profile can include the following.

- A set of BUX coding types that can be used to encode a BUX packet. A BUX coding type can be supported for transmit (Tx) and/or for receive (Rx). The set of BUX coding types can be numbered in ascending order such that coding types of older versions of a BUX mode can have lower number.
- A preferred receive modulation index value. In some embodiments, the preferred receive modulation index can indicate GFSK modulation.
- A BUX access code (AC) to be used.

In some embodiments, the hosts of two wireless devices can agree on the BUX coding types and a modulation index value that can be used in a BUX mode. The host of a wireless device can select the BUX coding types and modulation index value based on a set of rules. In some embodiments, the rules include the following.

The selected Tx coding type can be a coding type with the highest coding type number supported by the two wireless devices, i.e., a Tx coding type for the wireless device (having the host that is selecting) and an Rx coding type for the peer wireless device.

The selected Rx coding type can be a coding type with the highest coding type number supported by the two wireless devices, i.e., an Rx coding type for the wireless device with the selecting host and a Tx coding type for the peer wireless device.

The selected modulation index value associated with Tx GFSK modulation can be the peer wireless device's requested modulation index value.

Upon agreeing on BUX coding types and a modulation index value, a host of a wireless device can save these parameters as part of a set of pairing information to use with the particular peer wireless device. In this regard, a wireless device can save parameters associated with different peer wireless devices.

In some embodiments, in addition to a set of legacy BT Create Connection parameters used for establishing connection between peer wireless devices, the host 1902 of a wireless device can provide to the controller 1904 of the wireless device one or more the following BUX information: a negotiated Tx coding type, a negotiated Rx coding type, a Tx modulation index value, and a BUX AC associated with a peer wireless device. In some embodiments, the host 1902 and the controller 1904 are part of a master wireless device, e.g., the first wireless device 102, and the peer wireless device is a slave wireless device, e.g., the second wireless device 104.

In some embodiments, for a handsfree profile, an eSCO connection between BUX capable wireless devices can use 2-EV5 packets every 15 ms to carry voice information. This communication can permit a controller, e.g., the controller 1904, of a wireless device to activate a BUX mode of communication without the need to renegotiate the eSCO connection's packet types. The controller 1904 can start to use 2-EV5-B BUX encoded packets with BUX encoded voice data.

In some embodiments, the host 1902 can perform dynamic audio rate adaptation. In this regard, the host 1902 can set an audio bit rate based on a type of packets (e.g., BT legacy packets or BUX encoded packets) used when communicating with a peer wireless device. For example, activating or deactivating a BUX mode of communication can cause a change in the type of packets used in a connection. The change in packet type can result in a change in an available user payload. The host 1902 can readjust an audio bit rate in response to changes in the mode of communication, e.g., a BT legacy mode or a BUX mode, in order to optimize bandwidth usage. The host can readjust the audio bit rate following the activation of a BUX mode of communication or after a deactivation of the BUX mode of communication. As an example, the host 1902 can increase the audio bit rate in response to the deactivation of a BUX mode, as the BT legacy mode can support a higher audio bit rate (more bandwidth available) than the BUX mode. Similarly, the host 1902 can decrease the audio bit rate in response to activation of the BUX mode, as the BUX mode can support a lower audio bit rate (lower bandwidth available) than the BT legacy mode.

Figure 20:
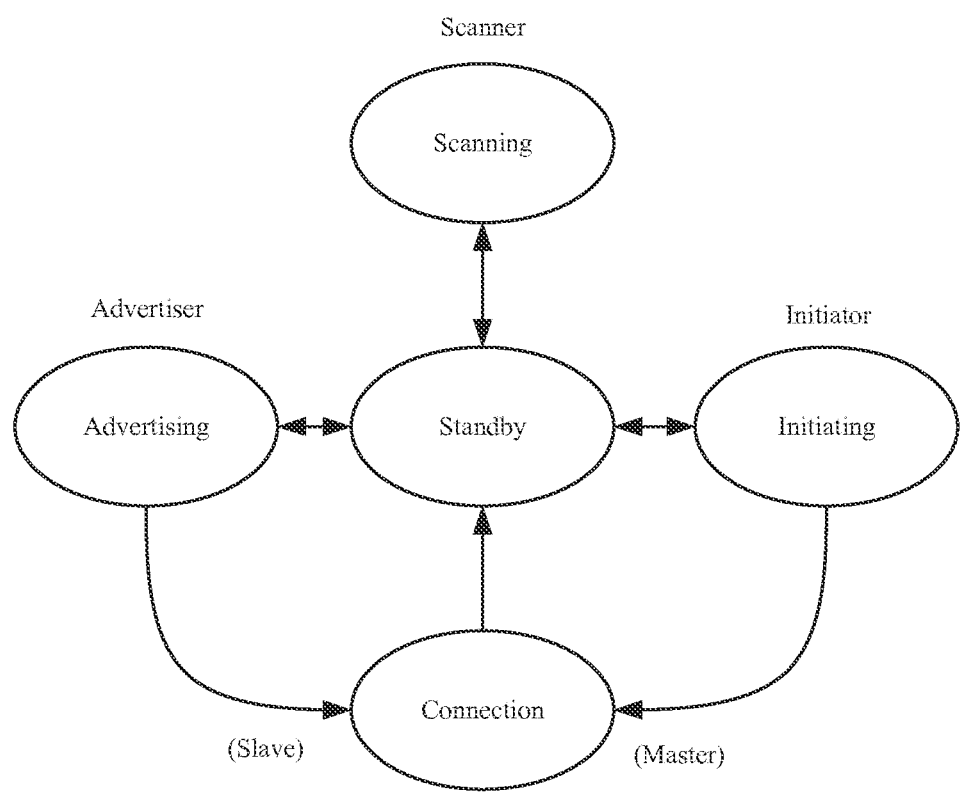
FIG. 20 illustrates an exemplary state transition diagram in accordance with some embodiments.

FIG. 20 shows an exemplary state transition diagram 2000 used to facilitate a connection between wireless devices operating in a Bluetooth low energy (LE) mode in accordance with a Bluetooth wireless communication protocol. For example, the state transition diagram 2000 can be in accordance with the Bluetooth low energy mode specified in the Bluetooth wireless communication protocol v4.0. In some embodiments, the first wireless device 102 can operate as an Initiator or a Scanner, while the second wireless device 104 can operate as an Advertiser, however it can be appreciated that the roles can also be reversed. The Advertiser can be a wireless device that operates in an advertising state. In the advertising state, the Advertiser can transmit advertising channel packets. Wireless devices operating as Scanners can scan for the advertising channel packets. An Initiator can initiate communications with an Advertiser and thereby bring the Advertiser and the Initiator into a connection state in a master/slave relationship.

FIG. 21A illustrates an exemplary BUX LE packet format 2100 that can be used for BUX mode communication in a Bluetooth LE mode of operation, in accordance with some embodiments. A Bluetooth LE packet coded for use in a BUX LE mode, referred to herein as a BUX LE packet, can have a format similar to but not identical to formats specified in a Bluetooth wireless communication protocol. For example, a BUX LE packet can have a format similar to a BT LE packet format as specified in the Bluetooth v4.0 wireless communication protocol. In some embodiments, BUX LE packets formatted as advertising channel packets can have the same format as BUX LE packets formatted as BUX data channel packets. A Link Layer of a Bluetooth wireless communication protocol can use one packet format for legacy BT LE packets and another packet format for BUX LE packets. In some embodiments, the BUX LE format 2100 can be used for both BUX LE advertising channel packets and BUX LE data channel packets. The BUX LE packet format 2100 can include a preamble 2102, an access address 2104, a BUX coded protocol data unit (PDU) 2106, and a BUX coded CRC 2108. In some embodiments, the preamble 2102 can have a length of one octet, the access address 2104 can have a length of eight octets, the BUX coded PDU 2106 can have a length ranging between six and eighty octets, and the BUX coded CRC 2108 can have a length of six octets. The minimum length of a BUX LE packet can be 168 bits, while the maximum length of a BUX LE packet can be 760 bits. In some embodiments, the preamble 2102 is transmitted first, followed by the access address 2104, the BUX coded PDU 2106, and ending with the BUX coded CRC 2108. In some embodiments, the BUX coded PDU 2106 and the BUX coded CRC 2108 are coded in a similar manner as used for a (non-LE) BUX packet as described elsewhere herein. In this regard, the BUX coded PDU 2106 and the BUX coded CRC 2108 can be coded using embodiments described herein for FIG. 11 and FIG. 12.

In some embodiments, the access address 2104 of the BUX LE packet format 2100 is assigned a particular value that indicates a BUX LE advertising channel packet. The access address 2104 for BUX LE data channel packets can vary for each Link Layer connection that exists between two wireless devices. BUX LE data channel packets can have a dedicated access address, referred to as a BUX LE data channel access address. In some embodiments, the BUX LE data channel access address can be based on a BUX LE device address that is used for BUX LE mode communication. The BUX LE device address can differ from the Bluetooth device addresses (BD_ADDRs) used for BT connections using BT legacy modes. The BUX LE device address can also differ from device addresses used in "regular" BUX modes. In some embodiments, the BUX LE device address is derived in the same manner as used to derive a BT access code, e.g., which can be specified in a Bluetooth wireless communication protocol. The BUX LE device address can be used internally by a wireless device that operates as an Initiator in BT LE operations. In this regard, the Initiator can use a BUX LE device address to communicate with a peer wireless device associated with the BUX LE device address.

FIG. 21B illustrates an exemplary payload format 2110 for a BUX_CONNECT_REQ PDU in accordance with some embodiments. The BUX_CONNECT_REQ PDU can be used for establishing a connection between two BUX capable peer wireless devices. The payload format 2110 can include an InitA 2112 field, an AdvA 2114 field, and an LLData 2116 field. Similar to the CONNECT_REQ PDU specified in the Bluetooth v4.0 wireless communication protocol, the InitA 2112 field can have a length of 6 octets, the AdvA 2114 field can have a length of 6 octets, and the LLData 2116 field can have a length of 26 octets. The InitA 2112 field can include an Initiator's public or random device address as indicated by a Transmit device address (TxAdd). The AdvA 2114 field can include an Advertiser's public or random device address as indicated by a Receive device address (RxAdd). The LLData 2116 field can include ten sub-fields as indicated in FIG. 21C.

FIG. 21C illustrates an exemplary LLData field format 2118 in accordance with some embodiments. In this regard, the 26 octets of the LLData 2116 field can be formatted in accordance with the LLData field format 2118. In some embodiments, the LLdata field format 2118 can include ten sub-fields including an AA-B sub-field 2120 spanning 8 octets of information. The AA-B sub-field 2120 can include a Link Layer connection's BUX access address as determined by the Link Layer in accordance with embodiments described herein for FIG. 21A. The remaining nine sub-fields can be defined similarly to corresponding fields included in a legacy BT CONNECT_REQ PDU, e.g., as specified in a Bluetooth wireless communication protocol such as the Bluetooth v4.0 wireless communication protocol.

Figure 22:
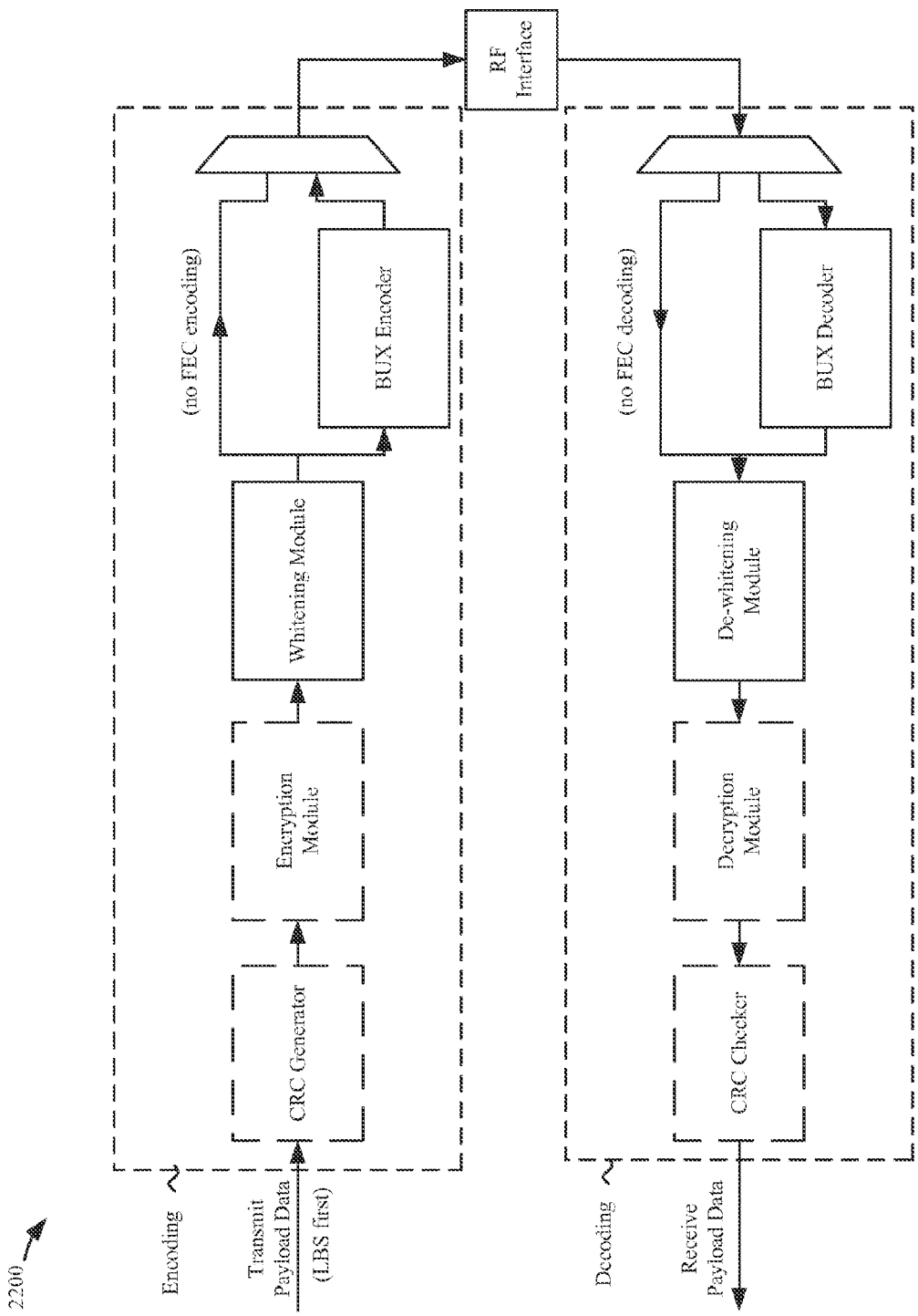
FIG. 22 illustrates another block diagram of an example payload data processing operation in accordance with some embodiments.

FIG. 22 illustrates an example payload bit processing operation 2200 in accordance with some embodiments. In this regard, the payload bit processing operation 2200 can be used for packets communicated using a BT LE legacy mode or a BUX LE mode. The encoding portion of the bit processing operation 2200 can be performed by a combination of hardware circuitry and/or software modules operating in a transmitting device e.g., the first wireless device 102. Similarly, the decoding portion of the bit processing operation 2200 can be performed by a combination of hardware circuitry and/or software modules operating in a receiving device, e.g., the second wireless device 104. In some embodiments, the payload encoding and decoding steps as shown for the bit processing 2200 resembles the payload encoding and decoding operations 1000 as shown in FIGS. 10 and 11 for the non-LE BUX mode. One difference between FIG. 22 and FIG. 10 is the absence of an FEC encoder for legacy BT LE packets. As specified in the Bluetooth v4.0 wireless communication protocol, BT LE payloads are not FEC encoded. In this regard, when the payload data is intended for a BT LE legacy packet, the payload data is not FEC encoded. When the payload data is intended for a BUX LE packet, BUX encoding/decoding can be performed on the payload data in accordance with the embodiments described for FIG. 11 and FIG. 12. Similar to encoding used for non-LE BUX packets, the BUX encoding applied to a BUX LE packet can result in an improved link margin. For example, a BUX LE GFSK mode that utilizes convolutional coding can provide an improvement in the link margin by 5.9 dB with respect to a non-BUX encoded GFSK mode. The CRC generation, encryption, and whitening operations shown in FIG. 22 for BUX LE packets can be the same as used for BUX packets as described for FIGS. 10 and 11. The CRC checking, decryption, and de-whitening operations shown in FIG. 22 for BUX LE packets can also be the same as used for BUX packets as described for FIGS. 10 and 11.

For a BT LE system, when a connection between a master wireless device and a slave device is established, communication can be divided into non-overlapping connection events. Within a connection event, communication uses the same radio frequency channel, i.e., the same channel index. Successive transmitted packets are spaced apart by at least a minimum inter-frame space time period. In some embodiments, the time interval between two consecutive packets communicated on the same channel index, referred to as the Inter Frame Space (IFS), can be defined as the time interval between (i) a time when the last bit of a previous packet was transmitted and (ii) a time when the first bit of a subsequent packet is transmitted. After receiving a legacy BT LE packet, the IFS can be set to a first value, e.g., 150 microseconds. After receiving a BUX LE packet, the IFS can be set to a second value, e.g., 200 microseconds. The IFS can thus vary for legacy BT LE packets and for BUX LE packets.

Referring again to FIG. 19 and FIG. 20, a BUX LE capable wireless device having the system 1900, can operate in an advertising state. In some embodiments, the advertising state of a BUX LE capable wireless device is the same as for a legacy BT LE wireless device except for a number of differences outlined herein. In some embodiments, a Link Layer of the controller 1904 can place the BUX LE capable wireless device in the advertising state when directed to by the host 1902. The host 1902 can direct the controller 1904 whether to use BUX LE advertising PDUs or to use BT LE legacy advertising PDUs. In this regard, the host 1902 can determine which advertising scheme the BUX LE capable wireless device can use while in the advertising state. When placed in the advertising state, the Link Layer can send advertising packets during advertising events. In some embodiments, the BUX LE capable wireless device can listen for at least two different types of access addresses while in the advertising state, namely (1) a BT LE legacy advertising access address and (2) a BUX LE advertising access address. The BUX LE capable wireless device can listen for both access addresses regardless of which type of advertising PDU used to advertise. For example, the BUX LE capable wireless device can advertise BT LE legacy advertising PDUs while listening for both BT LE legacy advertising access addresses and BUX LE advertising access addresses.

In some embodiments, a BUX LE capable wireless device operating as an Initiator or a Scanner can send BUX LE PDUs regardless of the type of advertising PDU received. A BUX LE capable wireless device that receives a BUX LE PDU from an Initiator or Scanner can interpret the receipt of the BUX LE PDU as an activation of a BUX LE mode of communication. For example, upon receiving a BUX LE PDU from a Scanner, the Advertiser can communicate using BUX LE PDUs in return to the Scanner until the BUX LE mode of communication is deactivated.

In some embodiments, a Scanner and/or an Initiator can listen for both BT LE "legacy" advertising access addresses and BUX LE advertising access addresses included in advertising PDUs. The Scanner and/or the Initiator can respond to an advertising PDU with either BUX LE PDUs or BUX LE legacy PDUs, regardless of the advertising PDU type received. For example, a Scanner can receive an advertising PDU that includes either a BT LE "legacy" advertising access address or a BUX LE advertising access address from an Advertiser and can respond with a BUX LE PDU. In other embodiments, the Scanner and/or the Initiator can respond to a received advertising PDU with a BUX LE PDU when it is known the Advertiser from which the advertising PDU is received is BUX LE PDU capable, regardless of the advertising PDU type that the Advertiser used in the advertising PDU. For example, during active scanning, the Scanner can always answer an Advertiser's advertising PDU with a BUX LE PDU when the Advertiser is capable of a BUX LE mode of communication. As described for a BUX LE capable Scanner, a BUX LE capable Initiator can respond to an Advertiser known to be BUX LE capable with a BUX LE PDU, regardless of the advertising PDU type that the Advertiser used.

In some embodiments, a BUX LE capable wireless device in a Connection state with another BUX LE capable wireless device can consider a BUX LE mode of communication to be active until the BUX LE mode of communication is deactivated. In this regard, the BUX LE mode of communication between two BUX LE capable wireless devices can be a default mode of communication when two BUX LE capable wireless devices are in a Connection state.

In some embodiments, the hosts of two wireless devices can share information regarding features and capabilities using device identification (DID) profiles. The sharing of information by the wireless devices can occur after a pairing operation between the wireless devices. The information included in the DID profiles can include details that indicate whether a wireless device is capable of a BUX LE mode of communication and particular aspects of BUX LE modes that are supported by the wireless device providing the DID profile. In some embodiments, the information in the DID profile can include:

(i) A type of coding used to code BUX LE PDUs, which can be referred to as a BUX LE coding type. A BUX LE coding type can be associated with a transmit (Tx) direction and/or with a receive (Rx) direction for processing. BUX LE coding types supported by the BUX LE capable wireless device can be numbered in ascending order such that coding types of older versions of a BUX LE mode can have lower number.

(ii) A preferred receive modulation index value. In some embodiments, a resolution of the preferred receive modulation index can be 0.05.

Two BUX LE capable wireless devices need to agree on the BUX LE coding types used for communication in each direction as well as the modulation index used for each direction. In some embodiments, the hosts of the two BUX LE capable wireless devices can agree on the BUX LE coding types and the modulation index value to be used for communication between the two BUX LE capable wireless devices. In some embodiments, the host of a BUX LE capable wireless device selects the BUX LE coding types and modulation index value based on a set of rules. In some embodiments, the rules can include:

(i) The selected BUX LE Tx coding type can be a coding type having the highest valued Tx coding type number supported by both BUX LE capable wireless devices (i.e., a BUX LE Tx coding type for the transmitting BUX LE capable wireless device and a corresponding compatible BUX LE Rx coding type for the receiving BUX LE capable wireless device in a particular direction of communication).

(ii) The selected BUX LE Rx coding type can be a coding type having the highest valued Tx coding type number supported by both devices (i.e., a BUX LE Rx coding type for the receiving BUX LE capable wireless device and a corresponding compatible BUX LE Tx coding type for the transmitting BUX LE capable wireless device in a particular direction of communication).

(iii) The selected modulation index value associated with Tx GFSK modulation for a transmitting BUX LE capable wireless device can equal a receiving BUX LE capable peer wireless device's requested modulation index value.

For each peer BUX capable wireless device, a BUX capable wireless device can save BUX LE parameters for that peer BUX capable wireless device as part of a set of pairing information applicable for the particular peer BUX capable wireless device. In some embodiments, the saved BUX LE parameters include Tx and Rx BUX LE coding types and a preferred modulation index value for the peer BUX capable wireless device. In some embodiments, the host of a BUX capable wireless device saves the parameters for the peer BUX capable wireless device as pairing information. In this regard, a BUX capable wireless device can save parameters associated with different peer BUX capable wireless devices.

In some embodiments, the host 1902 of a BUX LE capable wireless device in an advertising state determines whether to advertise using a legacy BT LE advertising PDU or a BUX LE advertising PDU.

In some embodiments, the host 1902 of the BUX LE capable wireless device operating in a "connectable" directed advertising mode can provide to the controller 1904 of the BUX LE capable wireless device, a set of BUX LE capability information (which can be part of a set of pairing information stored in the host 1902) of a peer BUX capable LE wireless device to which the advertising BUX LE capable wireless device seeks to connect. The controller 1904 of the advertising BUX LE capable wireless device can use either BT LE legacy advertising PDUs or BUX LE advertising PDUs accordingly based on the set of BUX LE capability information obtained for the peer BUX capable LE wireless device.

In some embodiments, a BUX LE capable wireless device operating as an Advertiser in an undirected advertising mode may not know which peer BUX LE capable wireless device will answer its advertising PDUs and may not know whether the answering wireless device is capable of a BUX LE mode of communication. The Advertiser can address this lack of foreknowledge by electing to use one of the following advertising schemes:

(i) Joint Advertising Scheme: Each advertising event can include both BUX LE PDUs and legacy BT LE PDUs. Using this joint advertising scheme, power consumption at the Advertiser can increase.

(ii) Alternating Advertising Scheme: The Advertiser can alternate between BUX LE advertising events and BT LE legacy advertising events (various duty cycles can be used). Using this alternating advertising scheme connection latency can increase.

In some embodiments, the host 1902 of the Advertiser can select the advertising scheme to be used and can inform the controller 1904 of the selected advertising scheme.

Figure 23A:
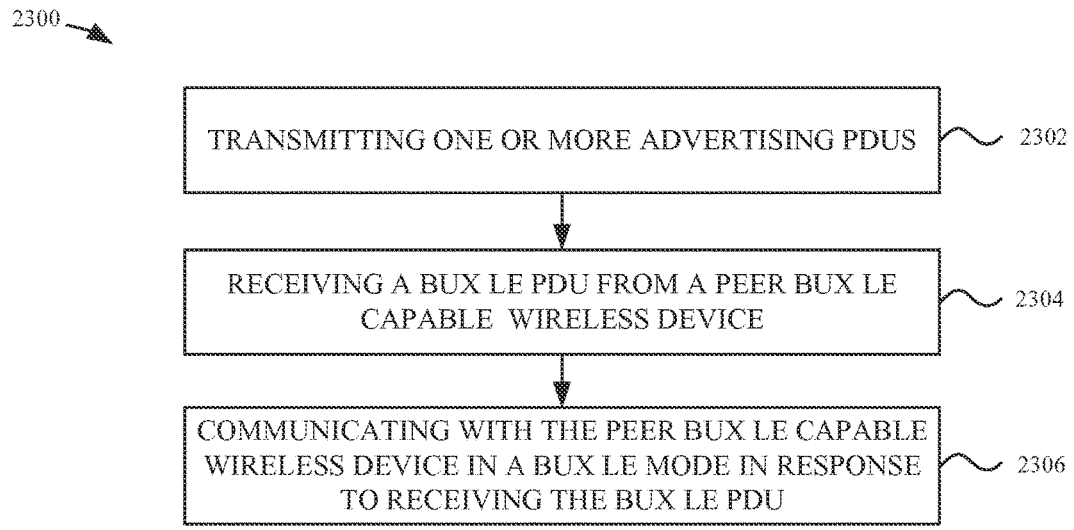
FIGS. 23A and 23B illustrate flow charts of example methods for activating another mode of communication in accordance with some embodiments.

FIG. 23A illustrates a flow chart 2300 of an example method for activating a BUX LE mode of communication between two BUX LE capable wireless devices in accordance with some embodiments. In this regard, FIG. 23A illustrates steps that can be performed by the second wireless device 104 operating as an Advertiser in accordance with various embodiments. Step 2302 can include the second wireless device 104 transmitting one or more advertising PDUs. The advertising PDUs can include BT LE legacy PDUs or BUX LE PDUs. At step 2304, the second wireless device 104 receives a BUX LE PDU from a peer BUX LE capable wireless device, such as the first wireless device 102, in response to the one or more advertising PDUs. For example, the BUX LE PDU received by the second wireless device 104 can be a BUX_CONNECT_REQ PDU or a BUX_SCAN_REQ PDU. Next, the second wireless device 104 communicates with the first wireless device 102 in a BUX LE mode of communication at step 2306, in response to receiving the BUX LE PDU from the first wireless device 102. In some embodiments, the Advertiser only communicates BUX LE PDUs with the first wireless device 102 until the BUX LE mode of communication is deactivated.

Figure 23B:
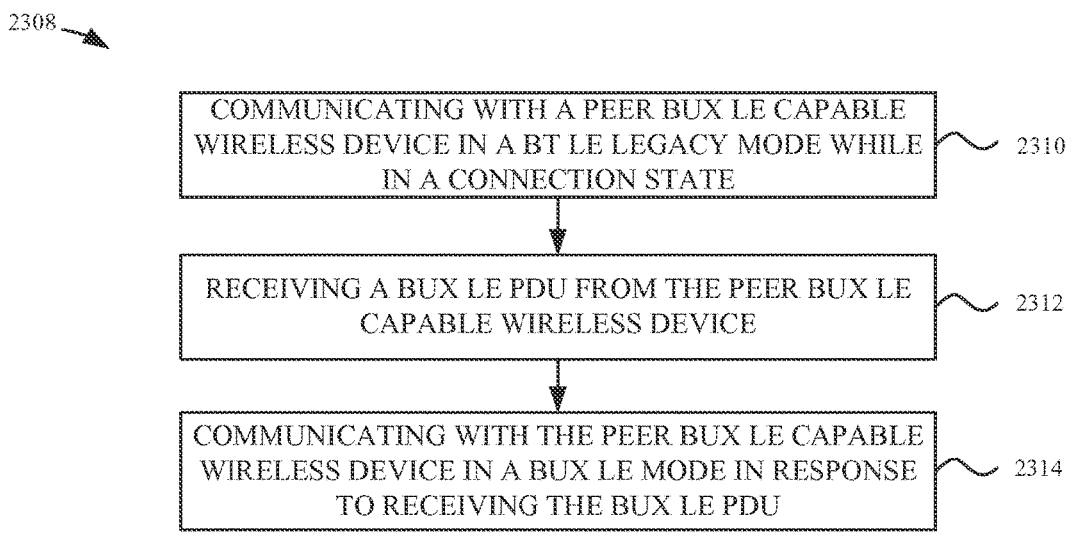

FIG. 23B illustrates a flow chart 2308 of another example method for activating a BUX LE mode of communication between two BUX LE capable wireless devices in accordance with some embodiments. In this regard, FIG. 23B illustrates steps that can be performed by the second wireless device 104 in accordance with various embodiments. Step 2310 can include the second wireless device 104 communicating with a peer BUX LE capable wireless device, e.g., the first wireless device 102, using a BT LE legacy mode of communication while in a Connection state. Thus, initially the first wireless device 102 and the second wireless device 104 can be connected using a legacy BT LE mode of communication. At step 2312, the second wireless device 104 receives a BUX LE PDU from the first wireless device 102. In response to receiving the BUX LE PDU, the second wireless device 104 communicates with the first wireless device 102 using the BUX LE mode of communication at step 2314. In this regard, receiving the BUX LE PDU while in a non-BUX BT LE connection (e.g., a BT LE legacy mode of communication) can be considered an indication of an activation of a BUX LE mode of communication between the first and second wireless devices 102/104. The second wireless device 104 can start sending BUX LE PDUs, after receiving the BUX LE PDU from the first wireless device 102 at step 2314. Similar, to the embodiments described for FIG. 16, the BUX LE capable wireless devices can switch between using BT LE legacy PDUs and BUX LE PDUs without the need to renegotiate the connection.

Figure 24:
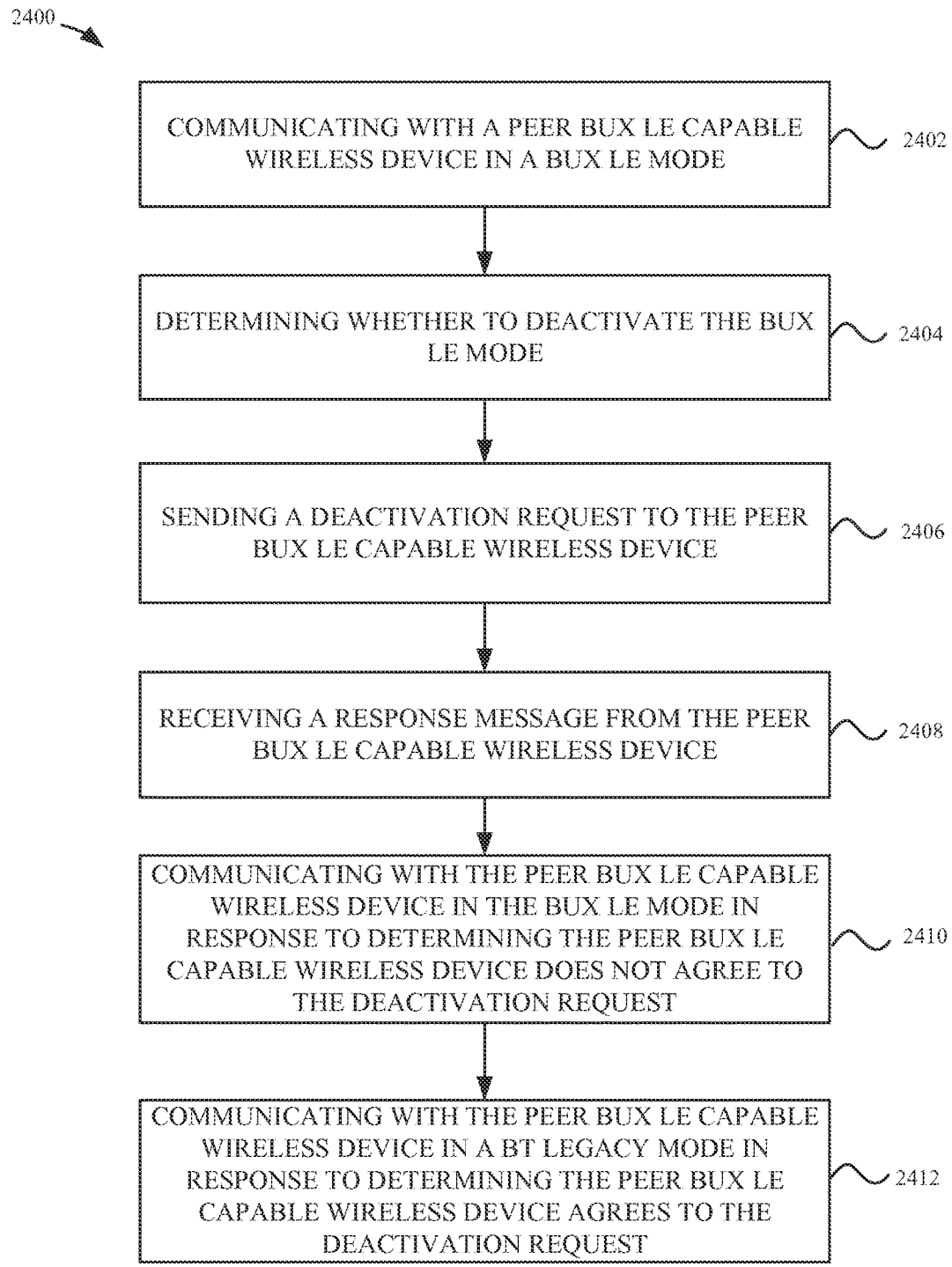
FIG. 24 illustrates a flow chart of an example method for changing a mode of communication in accordance with some embodiments.

FIG. 24 illustrates a flow chart 2400 of an example method for deactivating a BUX LE mode of communication in accordance with some embodiments. In this regard, FIG. 24 illustrates steps that can be performed by the first wireless device 102 in accordance with various embodiments. Although the following description describes the method performed by the first wireless device 102, it can be appreciated that method can also be performed by the second wireless device 104 in other embodiments. In this regard, the method of FIG. 24 can be performed by either peer BUX LE capable wireless device, (e.g., by the master or by the slave).

Step 2402 can include the first wireless device 102 communicating with the second wireless device 104 in a BUX LE mode of communication. Step 2404 can include the first wireless device 102 determining whether to deactivate the BUX LE mode of communication with the second wireless device 104. The determination can be based on detecting an improvement in signal quality in the communication link 106 or based on power consumption at the first wireless device 102. At step 2406, upon determining that the BUX LE mode of communication should be deactivated, the first wireless device 102 can send a deactivation request to the second wireless device 104. The deactivation request can include an LL_BUX_CONTROL PDU including a field having a "Disable" value specified.

Step 2408 includes the first wireless device 102 receiving a response from the second wireless device 104. The response can include an indication that the second wireless device 104 agrees to the deactivation request, e.g., the response message includes an LL_BUX_CONTROL PDU also having a field having a "Disable" value specified. Alternatively, the response can include an indication that the second wireless device 104 does not agree to the deactivation request, e.g., the response includes an LL_BUX_CONTROL PDU having a field with an "Enable" value specified. At step 2410, the first wireless device 102 continues to communicate with the second wireless device 104 using the BUX LE mode of communication in response to receiving the response that included an indication that the second wireless device 104 does not agree to the deactivation request.

Alternatively, at step 2412, the first wireless device 102 starts to communicate with the second wireless device 104 in a BT LE legacy mode of communication in response to receiving the response that included an indication that the second wireless device 104 agrees to the deactivation request. Accordingly, the second wireless device 104 can send a legacy BT LE PDU to the first wireless device 102 during the following connection event. In some embodiments, in the following connection event in which both peer wireless BUX capable devices may stop using BUX LE PDUs, e.g., in response to receiving a request to deactivate the BUX LE mode of communication, either of the BUX LE capable wireless devices can reactivate the BUX LE mode of communication by sending a BUX LE PDU to the other BUX LE capable wireless device.

Figure 25:
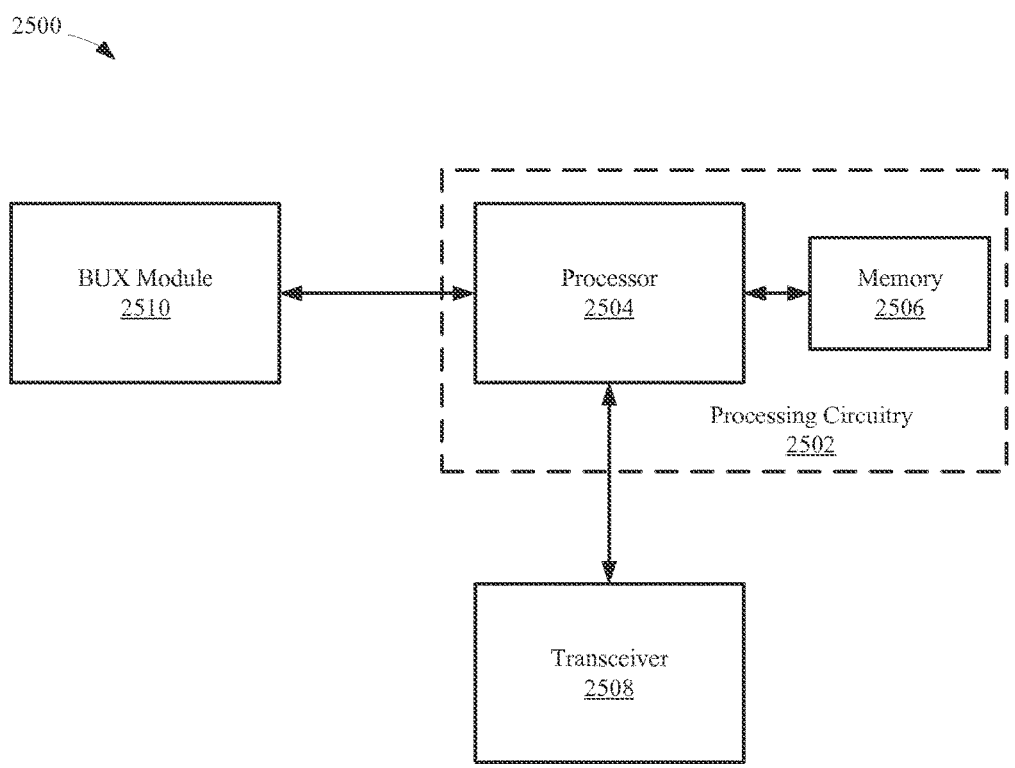
FIG. 25 illustrates a block diagram of an example apparatus that can be implemented in a wireless device in accordance with some embodiments.

FIG. 25 illustrates a block diagram of an example apparatus 2500 that can be implemented in a wireless device in accordance with some embodiments. In this regard, when implemented or included in a wireless device, such as the first wireless device 102 or the second wireless device 104, apparatus 2500 can provide for the wireless device to operate within the wireless system 100 in accordance with one or more embodiments described herein for legacy BT, legacy BT LE, BUX, and/or BUX LE modes of communication. It will be appreciated that the components, devices or elements illustrated in and described with respect to FIG. 25 may not be mandatory and thus some may be omitted in certain embodiments. Additionally, some embodiments can include further or different components, devices or elements beyond those illustrated in and described with respect to FIG. 25.

In some embodiments, the apparatus 2500 can include processing circuitry 2502 that can be configured to perform actions in accordance with one or more embodiments disclosed herein. In this regard, the processing circuitry 2502 can be configured to perform and/or control performance of one or more functionalities of the apparatus 2500 in accordance with various embodiments, and thus can provide means for performing functionalities of the apparatus 2500 in accordance with various embodiments. The processing circuitry 2502 can be configured to perform data processing, application execution and/or other processing and management services according to one or more embodiments.

In some embodiments, the apparatus 2500 or a portion(s) or component(s) thereof, such as the processing circuitry 2502, can include one or more chipsets, each of which can include one or more chips. The processing circuitry 2502 and/or one or more further components of the apparatus 2500 can therefore, in some instances, be configured to implement an embodiment on a chipset comprising one or more chips. In some embodiments in which one or more components of the apparatus 2500 are embodied as a chipset, the chipset can be capable of enabling a computing device to operate in the wireless system 100 when implemented on or otherwise operably coupled to the computing device. Thus, for example, one or more components of the apparatus 2500 can provide a chipset configured to enable a computing device to communicate using one or more wireless network technologies, e.g., in accordance with a BT and/or BT LE wireless communication protocol and/or implementing aspects of a BUX and/or BUX LE mode of communication.

In some embodiments, the processing circuitry 2502 can include a processor 2504 and, in some embodiments, such as that illustrated in FIG. 25, can further include memory 2506. The processing circuitry 2502 can be in communication with or otherwise control a transceiver 2508 and/or a BUX module 2510. The transceiver 2508 can include wireless circuitry that can be used to generate, process, encode, transmit, receive, decode, or apply other functions associated with a Bluetooth, Bluetooth LE, BUX, and/or BUX LE mode of communication.

The processor 2504 can be embodied in a variety of forms. For example, the processor 2504 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it can be appreciated that the processor 2504 can include a plurality of processors. The plurality of processors can be in operative communication with each other and can be collectively configured to perform one or more functionalities of the apparatus 2500 as described herein. In some embodiments, the processor 2504 can be configured to execute instructions that can be stored in the memory 2506 or that can be otherwise accessible to the processor 2504. As such, whether configured by hardware or by a combination of hardware and software, the processor 2504 can be capable of performing operations according to various embodiments while configured accordingly.

In some embodiments, the memory 2506 can include one or more memory devices. Memory 2506 can include fixed and/or removable memory devices. In some embodiments, the memory 2506 can provide a non-transitory computer-readable storage medium that can store computer program instructions that can be executed by the processor 2504. In this regard, the memory 2506 can be configured to store information, data, applications, instructions and/or the like for enabling the apparatus 2500 to carry out various functions in accordance with one or more embodiments. In some embodiments, the memory 2506 can be in communication with one or more of the processor 2504, the transceiver 2508, or the BUX module 2510 via one or more busses for passing information among components of the apparatus 2500.

The apparatus 2500 can further include the transceiver 2508. The transceiver 2508 can be configured to enable the apparatus 2500 to send and receive wireless signals in accordance with one or wireless networking technologies/protocols, such as a Bluetooth wireless communication protocol, a Bluetooth Low Energy (LE) wireless communication protocol, a BUX mode of communication, and/or a BUX LE mode of communication. As such, the transceiver 2508 can enable the apparatus 2500 to send signals to and receive signals from other wireless devices.

The apparatus 2500 can further include the BUX module 2510. The BUX module 2510 can be embodied as various means, such as circuitry, hardware, a computer program product comprising computer readable program instructions stored on a computer readable medium, e.g., the memory 2506, and executed by a processing device, e.g., the processor 2504, or some combination thereof. In some embodiments, the processor 2504 (or the processing circuitry 2502) can include, or otherwise control the BUX module 2510.

The BUX module 2510 can be configured to perform and control at least some of the Bluetooth "Better User Experience" (BUX) operations described herein. The BUX module 2510 can be embodied as various processing hardware-based means, software, or a combination thereof. In some embodiments, the BUX module 2510 can perform the packet coding operations as described for FIGS. 8-12 and FIG. 22. In some embodiments, the BUX module 2510 can be embodied as an exemplary Bluetooth host 1902. In some embodiments, the BUX module 2510 can operate in conjunction with the transceiver 2508, which can be configured to communicate in accordance with a Bluetooth wireless communication protocol and/or using a BUX mode of communication.

The various aspects, embodiments, implementations or features of the described embodiments can be used separately or in any combination. Various aspects of the described embodiments can be implemented in software, hardware, or a combination of hardware and software. The described embodiments can also be embodied as computer readable code on a non-transitory computer readable medium and/or a non-volatile computer readable medium. The non-transitory computer readable storage medium can be any data storage device that can store data, which can thereafter be read by a computer system. Examples of a computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for communicating between a first wireless device and a second wireless device over a communications link, the method comprising:
    by the first wireless device:
        establishing a connection with the second wireless device over the communications link;
        communicating with the second wireless device in a first mode of communication having a first instantaneous data rate and using a first forward error correction (FEC) encoding;
        detecting a loss of signal quality in the communications link;
        initiating a transition to communicate with the second wireless device in a second mode of communication having a second instantaneous data rate and using a second FEC encoding by at least sending either (i) a first type of packet, when the most recent correctly received packet from the second wireless device includes a first sequence number (SEQN) value, or (ii) a second type of packet, when the most recent correctly received packet from the second wireless device includes a second SEQN value, wherein the transition to communicate with the second wireless device in the second mode of communication does not cause a renegotiation of the connection with the second wireless device; and
        communicating with the second wireless device in the second mode of communication.

2. The method of claim 1, wherein the first wireless device establishes the connection with the second wireless device in accordance with a Bluetooth wireless communication protocol.

3. The method of claim 2, wherein the first wireless device communicates with the second wireless device in the second mode of communication by at least:
    FEC encoding packets using a convolutional encoder; and
    sending the FEC encoded packets to the second wireless device.

4. The method of claim 2, wherein the second instantaneous data rate is less than any data rate specified by the Bluetooth wireless communication protocol.

5. The method of claim 2, wherein the first mode of communication is an Enhanced Data Rate (EDR) mode in accordance with the Bluetooth wireless communication protocol.

6. The method of claim 2, wherein the first mode of communication is a Basic Rate (BR) mode in accordance with the Bluetooth wireless communication protocol.

7. The method of claim 1, wherein the first wireless device detects the loss of signal quality in the communications link by detecting a cyclic redundancy check (CRC) failure.

8. The method of claim 1, wherein:
    the first type of packet comprises a polling packet, and
    the second type of packet comprises a null packet.

9. The method of claim 8, wherein:
    the first SEQN value is a one, and
    the second SEQN value is a zero.

10. The method of claim 1, wherein the first wireless device communicates with the second wireless device in the first mode of communication using a first modulation scheme and communicates with the second wireless device in the second mode of communication using a second modulation scheme different from the first modulation scheme.

11. A first wireless device, comprising:
    a wireless interface;
    a processor;
    a storage apparatus configured to store instructions that, when executed by the processor, cause the first wireless device to:
        communicate with a second wireless device in a first mode of communication by at least:
            forward error correction (FEC) encoding packets using a first encoding operation in accordance with a Bluetooth wireless communication protocol, and
            sending to the second wireless device one or more packets FEC encoded using the first encoding operation;
        send to the second wireless device either (i) a first type of packet, when the most recent correctly received packet from the second wireless device includes a first sequence value, or (ii) a second type of packet, when the most recent correctly received packet from the second wireless device includes a second sequence value, the packet FEC encoded using a second encoding operation different from the first encoding operation, while communicating with the second wireless device in the first mode of communication, wherein sending the first type of packet or the second type of packet FEC encoded using the second encoding operation to the second wireless device requests activation of a second mode of communication with the second wireless device; and
        communicate with the second wireless device in the second mode of communication when the second wireless device agrees to communicating using the second mode of communication.

12. The first wireless device of claim 11, wherein the first wireless device operates as a master device and the second wireless device operates as a slave device.

13. The first wireless device of claim 11, wherein the first wireless device communicates with the second wireless device in the second mode of communication by at least:
FEC encoding packets using the second encoding operation, and
sending to the second wireless device one or more FEC packets encoded using the second encoding operation.

14. The first wireless device of claim 11, wherein the instructions, when executed by the processor, further cause the first wireless device to:
send to the second wireless device a deactivation request that indicates a request to deactivate communications in the second mode of communication with the second wireless device, while communicating with the second wireless device in the second mode of communication.

15. The first wireless device of claim 14, wherein the deactivation request comprises a link management protocol (LMP) message.

16. The first wireless device of claim 11, wherein the first encoding operation comprises FEC encoding in accordance with a Bluetooth wireless communication protocol.

17. The first wireless device of claim 16, wherein the second encoding operation comprises FEC encoding using a convolutional encoder.

18. A non-transitory computer-readable storage medium configured to store instructions that, when executed by a processor included in a first wireless device, cause the first wireless device to:
perform a pairing operation with a second wireless device, the pairing operation comprising receiving from the second wireless device information that indicates the second wireless device supports a second mode of communication;
establish a connection with the second wireless device over a communications link;
communicate with the second wireless device in a first mode of communication having a first instantaneous data rate and using a first forward error correction (FEC) encoding; and
transition between the first mode of communication and the second mode of communication with the second wireless device without renegotiating the connection with the second wireless device by at least sending either (i) a first type of packet, when the most recent correctly received packet from the second wireless device includes a first sequence (SEQN) value, or (ii) a second type of packet, when the most recent correctly received packet from the second wireless device includes a second SEQN value, the sending of the first type of packet or the second type of packet indicating a request to transition between the first and second modes of communication,
wherein the second mode of communication has a second instantaneous data rate and uses a second FEC encoding.

19. The non-transitory computer-readable storage medium of claim 18, wherein a link margin associated with the connection between the first wireless device and the second wireless device increases as a result of transitioning from the first mode of communication to the second mode of communication.

20. The non-transitory computer-readable storage medium of claim 18, wherein the first mode of communication uses a first modulation scheme and the second mode of communication uses a second modulation scheme different from the first modulation scheme.

* * * * *